(12) United States Patent
Bacim De Araujo E Silva et al.

(10) Patent No.: US 12,167,176 B1
(45) Date of Patent: Dec. 10, 2024

(54) AUGMENTED REALITY ROOM PROJECTOR

(71) Applicant: Apple Inc., Cupertino, CA (US)

(72) Inventors: Felipe Bacim De Araujo E Silva, San Jose, CA (US); Blake M Coughenour, Sunnyvale, CA (US); Dana F Segler, Jr., Cupertino, CA (US); Lee A Szuba, Sunnyvale, CA (US); Stuart J Wood, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 17/935,010

(22) Filed: Sep. 23, 2022

Related U.S. Application Data

(60) Provisional application No. 63/248,378, filed on Sep. 24, 2021.

(51) Int. Cl.
*H04N 9/31* (2006.01)

(52) U.S. Cl.
CPC ......... *H04N 9/3138* (2013.01); *H04N 9/3179* (2013.01)

(58) Field of Classification Search
CPC ............... G03B 21/145; G03B 21/208; G03B 21/2013; G03B 21/2033; G03B 21/2053; H04N 9/3138; H04N 9/3141; H04N 9/3152; H04N 9/3158; H04N 9/3161; H04N 9/3164; H04N 9/3179
See application file for complete search history.

(56) References Cited

U.S. PATENT DOCUMENTS

| | | | |
|---|---|---|---|
| 7,300,179 B1 * | 11/2007 | LaDuke | F21V 5/043 362/244 |
| 8,317,331 B2 | 11/2012 | Li | |
| 8,736,675 B1 * | 5/2014 | Holzbach | H04N 13/305 348/42 |
| 8,879,782 B2 | 11/2014 | Garlington et al. | |
| 9,134,593 B1 | 9/2015 | Worley, III | |
| 9,239,627 B2 | 1/2016 | Kryze et al. | |
| 9,261,762 B2 * | 2/2016 | Kim | H04N 21/4316 |

(Continued)

OTHER PUBLICATIONS

U.S. Appl. No. 17/240,447, filed Apr. 26, 2021, Michael D. Simmonds, et al.

(Continued)

*Primary Examiner* — Sultan Chowdhury
(74) *Attorney, Agent, or Firm* — Robert C. Kowert; Kowert, Hood, Munyon, Rankin & Goetzel, P.C.

(57) ABSTRACT

A spatial light system that may, for example, be used to project image content onto surfaces of a room. The system may include two or more projection units for emitting light onto surfaces within a room. The system may include a controller and two or more projection units, each module including an LED array, an array of light pipes, and a condenser lens. Two or more projection units may be connected to a flexible strip that provides power and data (e.g., serial data) to the projection units, a composable light emitter unit, or a bulb-form projection system. Two or more flex strips or composable light emitter units may be connected together to provide a serially-connected, flexible modular architecture for spatial light systems that allow the projection units to be conformed to a variety of configurations and shapes.

19 Claims, 31 Drawing Sheets

(56) References Cited

U.S. PATENT DOCUMENTS

| | | |
|---|---|---|
| 10,004,984 B2 | 6/2018 | Voris et al. |
| 10,297,082 B2 | 5/2019 | Wilson et al. |
| 10,388,641 B2 | 8/2019 | Martin |
| 10,921,878 B2 | 2/2021 | Noris et al. |
| 2007/0092189 A1* | 4/2007 | Morejon ............ G02B 26/0833 |
| | | 385/120 |
| 2009/0051831 A1* | 2/2009 | Bierhuizen .......... G03B 21/208 |
| | | 349/5 |
| 2010/0309390 A1 | 12/2010 | Plut |
| 2013/0342813 A1* | 12/2013 | Wang ................... G02B 27/017 |
| | | 353/15 |
| 2014/0160442 A1 | 6/2014 | Lee |
| 2014/0185285 A1 | 7/2014 | Jorgensen |
| 2016/0109102 A1* | 4/2016 | Kim .......................... F21K 9/00 |
| | | 362/249.03 |
| 2016/0150201 A1 | 5/2016 | Kilche |
| 2018/0129167 A1 | 5/2018 | Maimone |
| 2019/0212642 A1* | 7/2019 | McMillan ............. G03B 21/145 |
| 2019/0369298 A1* | 12/2019 | Ja ........................... G02B 3/0068 |
| 2020/0081492 A1 | 3/2020 | Wang |
| 2020/0088358 A1 | 3/2020 | Minor |
| 2020/0236759 A1* | 7/2020 | Jurik ........................ F21V 29/51 |
| 2021/0080637 A1* | 3/2021 | Brick ................. G02B 27/0172 |

OTHER PUBLICATIONS

U.S. Appl. No. 63/058,240, filed Feb. 5, 2021, Felipe Bacim de Araujo e Silva, et al.

U.S. Appl. No. 17/665,331, filed Feb. 4, 2022, Felipe Bacim de Araujo e Silva, et al.

\* cited by examiner

FIG. 2A　　　　　FIG. 2B

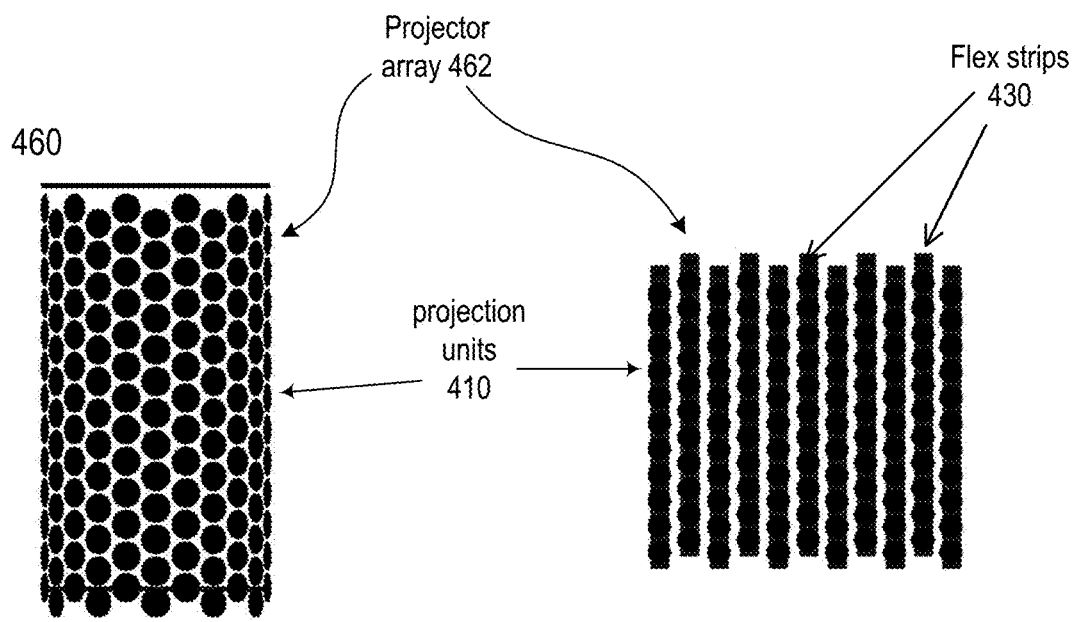
FIG. 4A
FIG. 4B
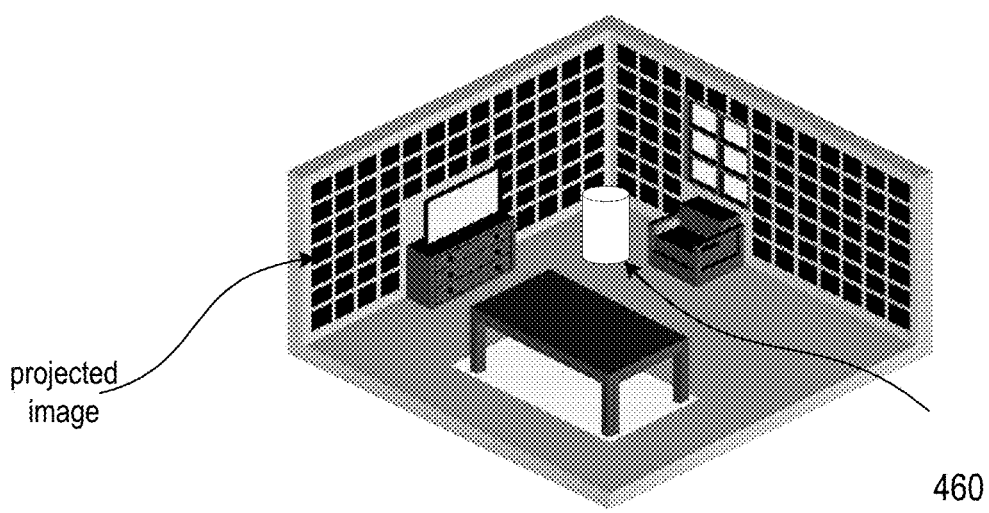
FIG. 4C (A)

(B)

(C)

*Light up a room*

*Even light across room*
*Mask things like TV, windows and your eyes*

AUGMENTED REALITY ROOM PROJECTOR

This application claims benefit of priority to U.S. Provisional Application Ser. No. 63/248,378, entitled "Augmented Reality Room Projector", filed Sep. 24, 2021, which is hereby incorporated by reference herein in its entirety.

BACKGROUND

Light emitting diodes (LEDs) are used in a variety of applications. LEDs can be produced that emit light in a variety of colors and wavelengths, including light in the visible and infrared (IR) portions of the spectrum.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for emitting light including light representing augmented reality (AR) content into environments such as rooms are described. Embodiments of a spatial light system are described that may, for example, be used to project AR content onto one or more surfaces of a room. In some embodiments, a spatial light system may include two or more light-emitting diode (LED) projection units for emitting light representing AR content onto surfaces within a room, onto object(s) within a room, or onto surfaces in a portion of a room. In some embodiments, a spatial light system may also be configured to emit diffuse light to illuminate a room, object(s) within a room, or a portion of a room when not emitting light representing AR content.

In some embodiments, a spatial light system may include a controller comprising one or more processors and one or more projection units. Embodiments of projection units are described that each include an active matrix LED array, an array of light pipes, and condensing optics (referred to as a condenser lens). The LED array may, for example, be an array of individually addressable LEDs. The LEDs may include white light-emitting LEDs and color-emitting LEDs. While embodiments are generally described in which projection units include light pipe arrays, other combinations of light collection or light shaping optical elements may be used.

In some embodiments, two or more projection units may be connected to a flexible strip (referred to as a flex strip) that provides power and data (e.g., serial data) to the projection units. Two or more flex strips may be connected together. The flex strips of projection units provide a serially-connected, flexible modular architecture for spatial light systems that allow the projection units to be conformed to a variety of configurations and shapes. However, in some embodiments, the projection units may be mounted to a fixed surface that includes connections for power and/or data for the modules. In some embodiments, one or more other modules such as sensor modules (depth sensors, light sensors, motion sensors, cameras, etc.) may also be connected to the flex strips in addition to the projection units, for example to provide depth information for surfaces and object in the room, or to detect presence and motion of persons in the room.

In some embodiments, the light source or projection unit(s) may be implemented as a composable light emitter module. The composable light emitter module may include a substrate such as a printed circuit board. The LEDs and the light pipes may be attached to the circuit board. For example, the light pipes may be printed on the circuit board using a specular 3D printing process. The circuit board may include the necessary circuitry for individually addressing the LEDs, and also connections for connecting to other composable LED modules. Multiple composable LED modules may be connected together to create a larger light source. For example, in some embodiments, a composable module may have a hexagonal shape, and seven hexagonal modules may be combined in a spatial arrangement to create a light source with a curved emission surface optimized for a spherical lens.

In some embodiments, components of a spatial light system including but not limited to the projection units may be packaged or contained within an enclosure or "bulb-like" structure of a transparent or semi-transparent material (e.g., glass or plastic). In some embodiments, a spatial light system may be connected to electrical power, for example via a conventional light socket or via a conventional power plug. Embodiments of a spatial light system as described herein, may, for example, be hung from a ceiling, or mounted on floor or table stands. In some embodiments, the light sources inside the light bulb may be implemented with a switchable light diffuser, which can switch the light bulb from a pixelated projection mode to a non-pixelated projection mode to mimic a standard light bulb.

In some embodiments, a spatial light system may include a controller or control system that may, for example, provide power and video signals to the LED projection units. In some embodiments, a spatial light system may also include wireless technology that enables wireless communications between the spatial light system and other devices, such as an AR/VR system (e.g., an AR/VR headset or glasses), a mobile multipurpose device such as a smartphone, pad or tablet device, a smart TV, or a computer system. In some embodiments, a spatial light system may instead or also include technology that enables wired connection between the spatial light system and other devices.

In some embodiments, a spatial light system may include integrated sensors to detect objects and surfaces (e.g., people and specular surfaces such as mirrors or windows) within a room, and/or to detect light levels within a room. The sensors may also determine depth of objects or surfaces, and types of objects or surfaces within a room. In some embodiments, at least one of the sensors may use infrared (IR) light to detect objects or surfaces. Information about objects and surfaces within a room collected by the sensors may be fed back to a controller of the spatial light system, which may use the information in controlling operation of the projection units of the spatial light system.

A spatial light system may include a controller comprising one or more processors to which projection units are connected, for example via flex strips. The controller may drive or control the projection units on the flex strips to emit light into a room according to image content and room information. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. For example, one or more sensors may collect lighting information for existing artificial and natural light sources in a room, such as lamps, televisions, and windows. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the system. In these embodiments, the system controller may be relatively simple, projecting images onto surfaces based on the room information obtained from an external device. In some embodiments, the room information may be generated by the system controller from data obtained from one or more sensor modules of the system, for example sensor modules coupled to the flex strips on which the projection units are coupled. In these embodiments, the system controller may be relatively more complex to provide the needed processing power.

Image content to be projected by the spatial light system may be obtained from an external device, for example via a wireless connection, or alternatively may be generated based on image information stored locally in memory of the system. The spatial light system may, for example, project illuminating light, AR imagery, patterns, or other image content onto the floor, walls, and/or ceiling of a room based on the image content and room information. However, the system may also intelligently light or augment particular objects found within a room, and/or intelligently not illuminate certain surfaces or objects such as windows or television screens, or persons, within a room, based on the room information obtained from an external device or generated by the system controller from data collected by sensors.

In some embodiments, the room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system. For example, upon detecting a person within the room, the spatial light system may lower the intensity of the light projected towards that person by one or more of the projection units to avoid "dazzling" the person with intense light. As another example, the spatial light system may adjust one or more of the projection units to focus the projected imagery at different depths as detected by the sensors. As yet another example, the spatial light system may lower the intensity of projected light, or not project light, towards a reflective surface to avoid unwanted reflective light from the reflective surface. As yet another example, the spatial light system may project light towards an identified object or objects within the room to intentionally highlight or "spotlight" those objects. As still yet another example, a spatial light system may include one or more sensors that allow the system to track moving objects or persons in a room; the spatial light system may then project light with respect to the tracked object or person to augment that object or person, for example to project light in front of a moving toy car to provide the appearance of headlights of the car, or to "spotlight" a moving person in a room.

In some embodiments, the system may project 2D images of AR or other image content onto surfaces in the room, for example at least portions of the walls, ceiling, and floors, or onto objects within the room. In some embodiments, the image content projected by the system may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the system may also be configured to emit diffuse light to illuminate a room when not emitting light representing AR or other image content. In some embodiments, the system may emit spatial light in combination with other devices, for example to provide the expansion of television content. In some embodiments, the system may emit light to provide a low resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

BRIEF DESCRIPTION OF THE DRAWINGS

FIGS. 2A through 2C illustrate a lamp configuration for a spatial light system, according to some embodiments.

FIGS. 4A through 4C illustrate a cylinder configuration for a spatial light system, according to some embodiments.

Figure 1A:
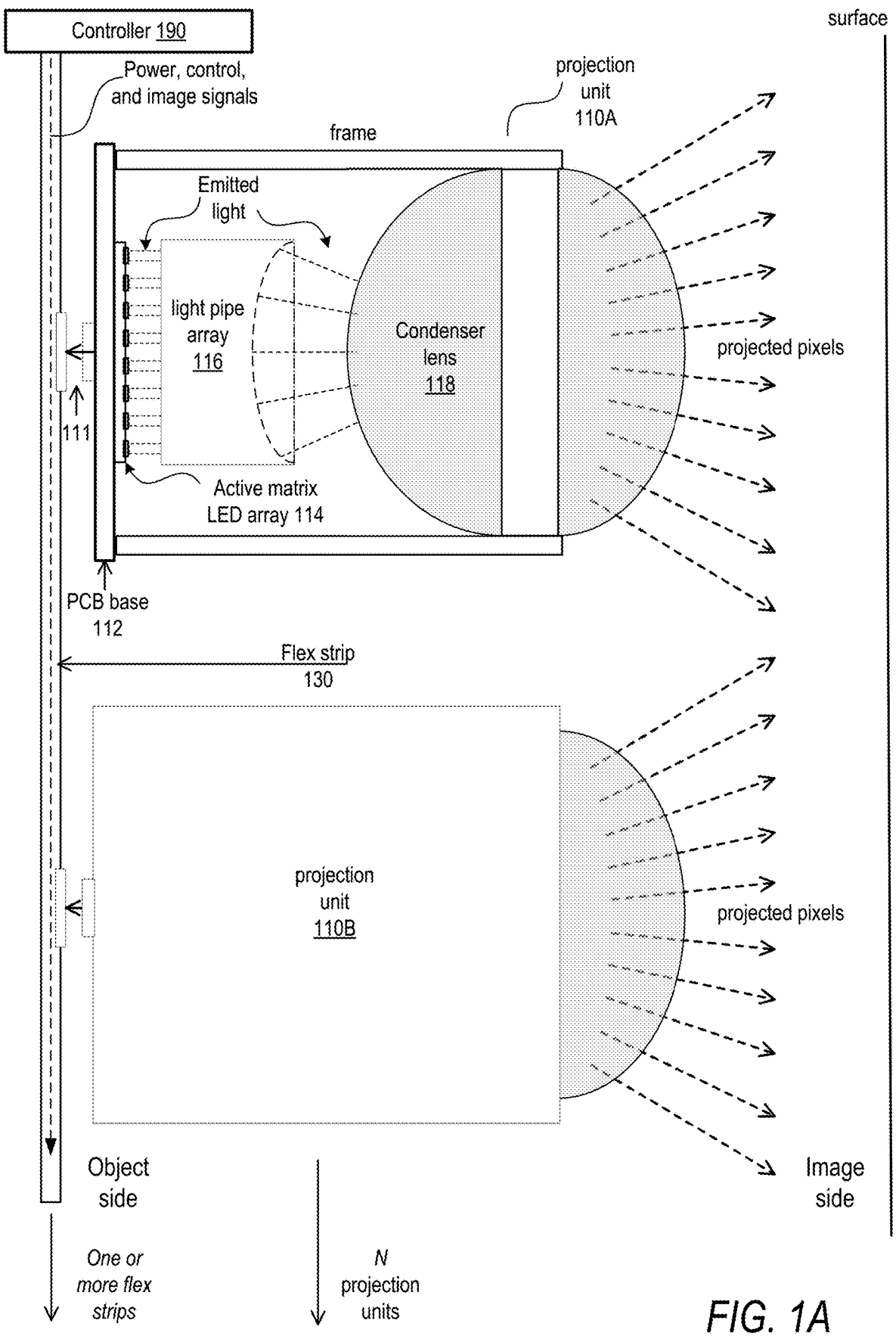
FIGS. 1A through 1G illustrate projection units mounted on a flexible strip, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for emitting light including light representing augmented reality (AR) content into environments such as rooms are described. Embodiments of a spatial light system are described that may, for example, be used to project AR content onto one or more surfaces of a room. In some embodiments, a spatial light system may include two or more light-emitting diode (LED) projection units for emitting light representing AR content onto surfaces within a room, onto object(s) within a room, or onto surfaces in a portion of a room. In some embodiments, a spatial light system may also be configured to emit diffuse light to illuminate a room, object(s) within a room, or a portion of a room when not emitting light representing AR content.

In some embodiments, two or more projection units may be connected to a flexible strip (referred to as a flex strip) that provides power and data (e.g., serial data) to the projection units. Alternatively, power and/or data for the projection units may come from another source. Two or more flex strips may be connected together. The flex strips of projection units provide a serially-connected, flexible modular architecture for spatial light systems that allow the projection units to be conformed to a variety of configurations and shapes as described herein. However, in some embodiments, the projection units described herein may be mounted to a fixed surface that includes connections for power and/or data for the modules. In some embodiments, one or more other modules such as sensor modules (depth sensors, light sensors, motion sensors, cameras, etc.) may also be connected to the flex strips in addition to the projection units, for example to provide depth information for surfaces and object in the room, or to detect presence and motion of persons in the room.

Embodiments of a spatial light system may include a controller comprising one or more processors to which the flex strips are connected and that drives or controls the projection units on the flex strips to emit light into a room according to image content and room information.

The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the spatial light system. In these embodiments, the controller may be relatively simple, projecting images onto surfaces based on the room information obtained from an external device. In some embodiments, the room information may be generated by the controller from data obtained from one or more sensor modules coupled to the flex strips. In these embodiments, the controller may be relatively more complex to provide the needed processing power.

The image content to be projected may be obtained from an external device, for example via a wireless connection to the spatial light system, or alternatively may be generated based on image information stored locally in memory on the spatial light system. In some embodiments, the spatial light system may provide room illumination, augmenting existing light sources in either shape, structure, and/or color, as well as projecting AR or other imagery onto one or more surfaces in the room. A spatial light system may, for example, project illuminating light, AR imagery, patterns, or other image content onto the floor, walls, and/or ceiling of a room. However, the spatial light system may also intelligently light or augment particular objects found within a room, and/or intelligently not illuminate certain surfaces or objects such as windows or television screens, or persons, within a room.

The room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system. For example, upon detecting a person within the room, the spatial light system may lower the intensity of the light projected towards that person by one or more of the projection units to avoid "dazzling" the person with intense light. As another example, the spatial light system may adjust one or more of the projection units to focus the projected imagery at different depths as detected by the sensors. As yet another example, the spatial light system may lower the intensity of projected light, or not project light, towards a reflective surface to avoid unwanted reflective light from the reflective surface. As yet another example, the spatial light system may project light towards an identified object or objects within the room to intentionally highlight or "spotlight" those objects.

In some embodiments, the spatial light system may project 2D images of AR or other image content onto surfaces in the room, for example at least portions of the walls, ceiling, and floors, or onto objects within the room. In some embodiments, the image content projected by the spatial light system may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the spatial light system may also be configured to emit diffuse light to illuminate a room when not emitting light representing AR or other image content. In some embodiments, the spatial light system may replicate or simulate all or a portion of generic illumination that typical light sources such as floor, ceiling, wall, or tabletop lamps or light fixtures provide. In some embodiments, the system may emit spatial light in combination with other devices, for example to provide the expansion of television content. In some embodiments, the system may emit light to provide a low resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

In some embodiments, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

In some embodiments, two or more spatial light systems in a room may be configured to communicate using light as a form of "wireless" information transfer medium. In some embodiments, a spatial light system may be configured to pulse light at a frequency that is not detectable to the human eye; the pulsed light can carry information about the device to one or more other spatial light systems or other devices in a room. The information conveyed may, for example, include information about the spatial light system's location in the room, current intensity, or any other relevant information about the device and room environment that the spatial light systems need to operate collaboratively. Further, a spatial light system may include light sensors to receive pulsed light signals from other devices in a room, and the spatial light system controller may be configured to generate and interpret the pulsed light signals. This allows two or more spatial light systems in a room to communicate in an open manner without having to physically connect the devices, and makes it easy to scale spatial light system installations in a room. Using pulsed light signals, two or more spatial light system devices just need to be able to "see" each other in a room to communicate directly via light that they already emit. Note that visible or non-visible wavelengths of light, or both, may be used as a pulsed light information transfer medium.

In some embodiments, light from a spatial light system may be used to power another spatial light system within a room, or to power other devices such as sensors within a room. Further, a spatial light system may include technology that allows the spatial light system to be powered by light from another spatial light system or other light source.

In some embodiments, components of a spatial light system including but not limited to the projection units may be packaged or contained within an enclosure or "bulb-like" structure of a transparent or semi-transparent material (e.g., glass or plastic). In some embodiments, a spatial light system may be connected to electrical power, for example via a conventional light socket or via a conventional power plug. Embodiments of a spatial light system as described herein, may, for example, be hung from a ceiling, mounted on a wall or object, or mounted on floor or table stands.

While embodiments of a spatial light system are generally described as including flex strips with pluggable projection units (and possibly other modules such as sensors) that are applied to the outer surface of an object such as a cylinder or sphere, or to a curved or flat surface of an object such as a disk, and in which the flex strip provides connectivity between the modules and the controller, in some embodiments an object such as a cylinder, sphere, or disk may be manufactured with integrated wiring that connects the projection (and other) modules to the controller, and via which the controller drives the projection units.

While the controller is generally described as being a component of the spatial light system, and thus may be contained within the spatial light system enclosure, in some embodiments at least a portion of the controller may be external to the spatial light system enclosure. Further, in some embodiments, at least some of the functionality of the controller as described herein may be performed by a device external to the spatial light system that communicates with the system via a wired or wireless connection.

In some embodiments, in addition to room information that identifies surfaces, objects, and other information about a room in which the spatial light system is in, the spatial light system may obtain or store information about the layout and orientation of the projection units (and sensor modules if present) of the system. This information may provide a mapping between particular projection units and the content of the room, and may be used along with the room information in controlling the projection units, and the LEDs within projection units, when projecting light into the room environment.

In some embodiments, a spatial light system may include one or more actuators that can automatically move the system, for example under control of an external device. As an example, a lamp or disk spatial light system may move to illuminate different portions of a surface or room, or to track an object or person in motion. As another example, a cylinder or sphere spatial light system may be rotated within a room.

In some embodiments, a spatial light system or one or more projection units of a spatial light system may include at least one camera for tracking objects or persons within a room. In some embodiments, a camera may be implemented as a module that plugs into a flex strip. In some embodiments, at least one of the projection units may include an embedded camera. In some embodiments, the embedded camera may be confocal with the light projection mechanism of the projection unit; that is, the camera uses the same optical path as the light projection mechanism of the projection unit to capture images or video of a portion of a room. Tracking an object or person may, for example, allow the spatial light system to project light with respect to a moving object or person to augment that object or person, for example to project light in front of a moving toy car to provide the appearance of headlights of the car, or to "spotlight" a moving person in a room.

In some embodiments, an external device such as a smartphone may include applications or interfaces that allow a user to control operations of the spatial light system, for example to select content to be projected, to switch between projecting content and room illumination, to control the brightness of the system, to signal actuators to reposition the spatial light system, and so on.

FIGS. 1A through 1G illustrate projection units mounted on a flexible strip, according to some embodiments.

FIG. 1A illustrates an example projection unit 110A coupled to a flex strip 130, according to some embodiments. Note that the shape, size, and configuration of the components shown in FIG. 1A are given by way of example, and are not intended to be limiting. In some embodiments, a projection unit 110A may include, but is not limited to, a substrate or base 112 (e.g., a printed circuit board (PCB)), an active matrix LED array 114 coupled to the base 112, a light pipe array 116, and condensing optics (condenser lens 118), all contained within a frame that is mounted to the base 112. While not shown, in some embodiments, a projection unit 110A may also include other non-visible light emitters that may, for example, be used to communicate with other devices using pulsed light signals, and/or to excite other components (e.g., phosphors). The projection unit 110A may couple to/plug into a flex strip 130 via one or more connections 111 between the PCB base 112 and the flex strip 130. In some embodiments, two or more projection units 110 (110A and 110B shown in this example) may be coupled to a flex strip 130, a flex strip 130 may be coupled to a spatial light system controller 190, and two or more flex strips 130 may be coupled together to form a "chain" of flex strips 130. The flex strips 130 can then be conformed to a shape of the spatial light system (e.g., a disk, sphere, cylinder, etc.).

Figure 1B:
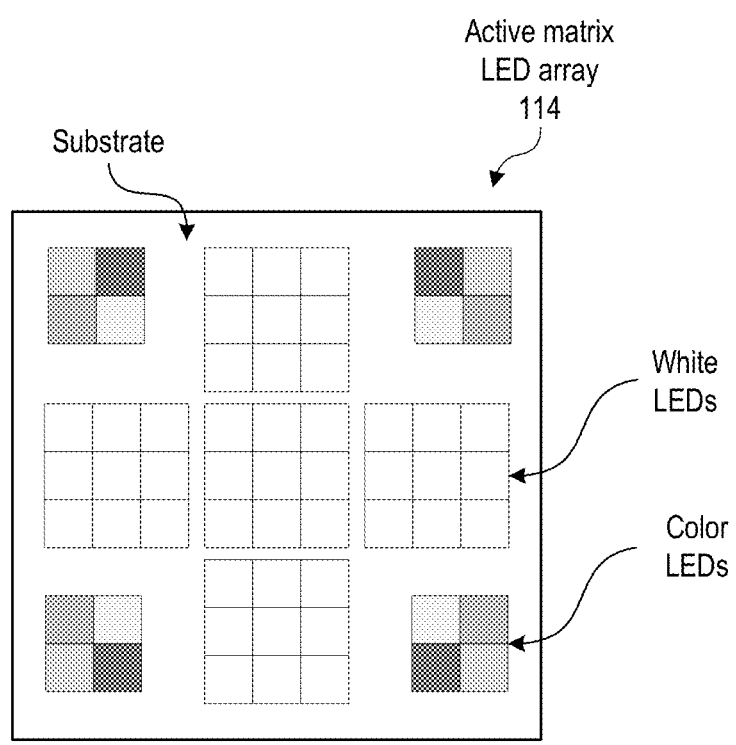

The flex strip 130 includes wiring that provides control and image signals, as well as power, to a projection unit 110A via connection 111. The control and image signals selectively drive individual LEDs on LED array 114 to turn on or off individual ones of the LEDs, change the intensity or depth of focus, etc. of the LEDs. The LEDs may include white as well as color LEDs, for example as shown in FIG. 1B. In some embodiments, the LEDs may include LEDs configured to emit light in non-visible illumination wavelengths, or in any combination of wavelengths including but not limited to multiple white spectrums to form a broader spectrum of illumination. The LEDs selectively emit light to the light pipe array 116. Broadly defined, a light pipe is an optical component that may be used to increase the uniformity of a light source and/or to direct light. Light pipes may also be referred to as homogenizing rods, light guides, homogenizers, or light funnels. While embodiments are generally described in which projection units include light pipe arrays, other combinations of light collection or light shaping optical elements may be used.

In some embodiments, there is one light pipe per LED in the light pipe array 116. The light pipes in the light pipe array 116 guide the light emitted by the LEDs and emit the light towards the condenser lens 118. Broadly defined, a condenser lens is an optical lens which renders a divergent beam from a point source into a parallel or converging beam to illuminate an object or surface. The condenser lens 118 affects the emitted light received from the light pipe array 116 to project pixels (or portions of pixels) onto a surface or object in the room. Note, however, that a projected "pixel" on a surface may be formed by light projected from two or more projection units 110. In other words, the light projected by a given projection unit 110 (e.g., 110A) may overlap with the light projected by one or more other (typically adjacent) projection units 110 (e.g., 110B) to form "pixels" on surface(s) within a room, all under control of controller 190; collectively the "pixels" form image(s) on the surface(s).

As previously mentioned, in some embodiments the individual projection units 110 may be controlled by controller 190 via a serial communications protocol through flex strip 130. In some embodiments, the serial communications protocol may be SDI (serial digital interface). However, other communications protocols may be used. In some embodiments, SDI may provide a 30 MHz rate at 16 bit color depth, and may maintain a 60 Hz per second frame rate.

In some embodiments, one or more projection units 110 of a spatial light system may be configured to pulse light at a frequency that is not detectable to the human eye; the pulsed light can carry information about the device to one or more other spatial light systems or other devices in a room. The information conveyed may, for example, include information about the spatial light system's location in the room, current intensity, or any other relevant information about the device and room environment that the spatial light systems need to operate collaboratively. Further, a spatial light system may include light sensors to receive pulsed light signals from other devices in a room, and the spatial light system controller 190 may be configured to generate and interpret the pulsed light signals. Note that visible or non-visible wavelengths of light, or both, may be used as a pulsed light information transfer medium.

FIG. 1B illustrates an example active matrix LED array 114, according to some embodiments, and is not intended to be limiting. In this example, there are five 3×3 squares of white LEDs arranged in a cross pattern, and four groups of color LEDs with four colors (e.g., red, green, blue, and yellow) in each group, for a total of 45+16=61 LEDs. While FIG. 1B shows the individual LEDs as adjacent squares for illustrative purposes, in practice there may be gaps between the individual LEDs.

In some embodiments, the spatial light system performs color mixing in the system. A given pixel on a surface may thus be formed of white light from one or more of the white LEDs in one or more of the projection units 110, or a mix of white and color light from the white and color LEDs in one or more of the projection units 110. In some embodiments, the LEDs may include LEDs configured to emit light in non-visible illumination wavelengths, or in any combination of wavelengths including but not limited to multiple white spectrums to form a broader spectrum of illumination.

Figure 1C:
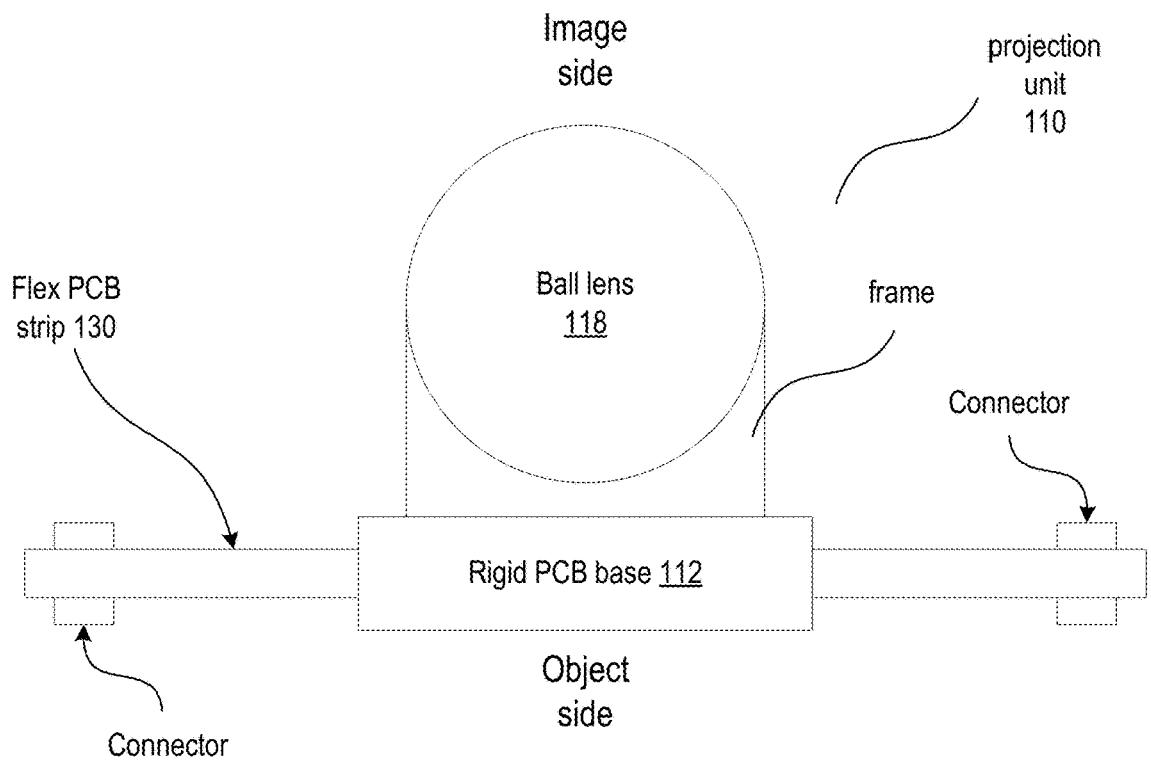
Figure 1D:
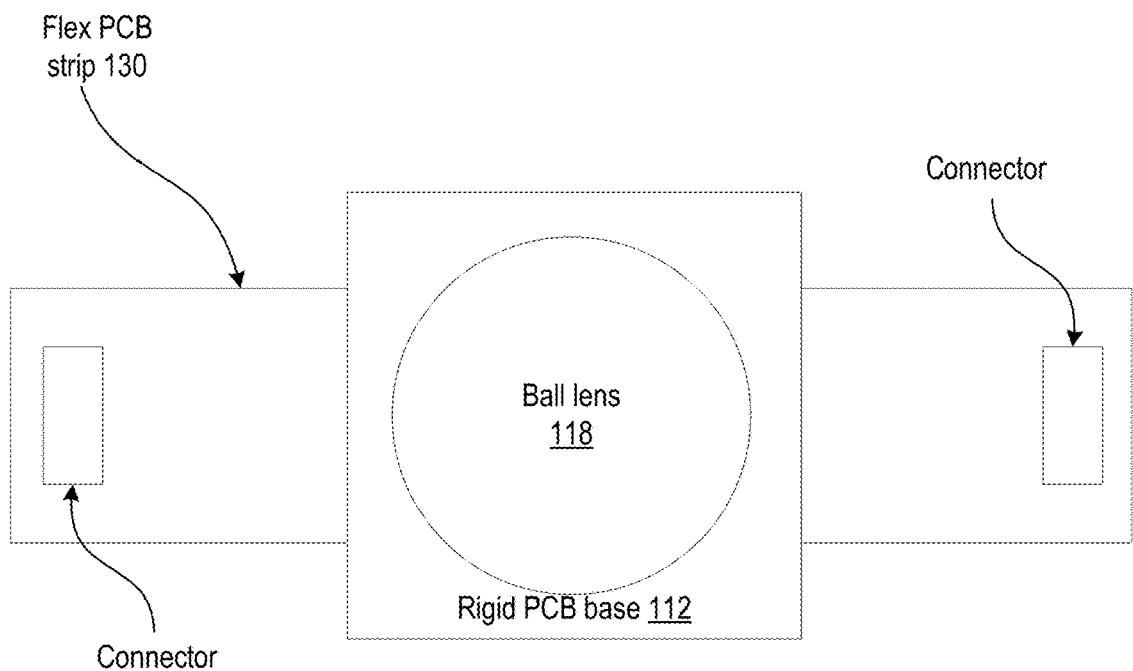

FIGS. 1C and 1D graphically illustrate an example projection unit 110 attached to a flex PCB strip 130, according to some embodiments. FIG. 1C shows a side view of a flex PCB strip 130 and projection unit 110. FIG. 1D shows a top view of the flex PCB strip 130 and projection unit 110 of FIG. 1C. A flex strip may be a flexible PCB strip 130 that includes one or more connectors. Projection unit 110 is attached to the flex PCB strip 130 via corresponding connectors on a rigid PCB base 112. A condenser lens 118 (in this example, a ball lens) is mounted on a frame above the rigid PCB base 112. While not shown, the projection unit 110 may also include, but is not limited to, an LED array and light collection or light shaping optical elements such as a light pipe array.

Figure 1E:
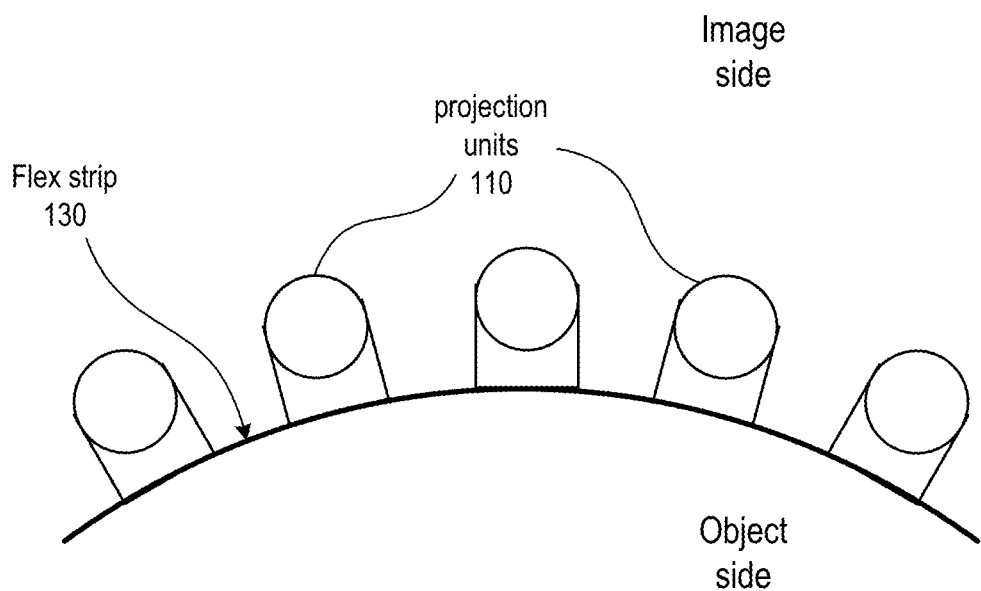
Figure 1F:
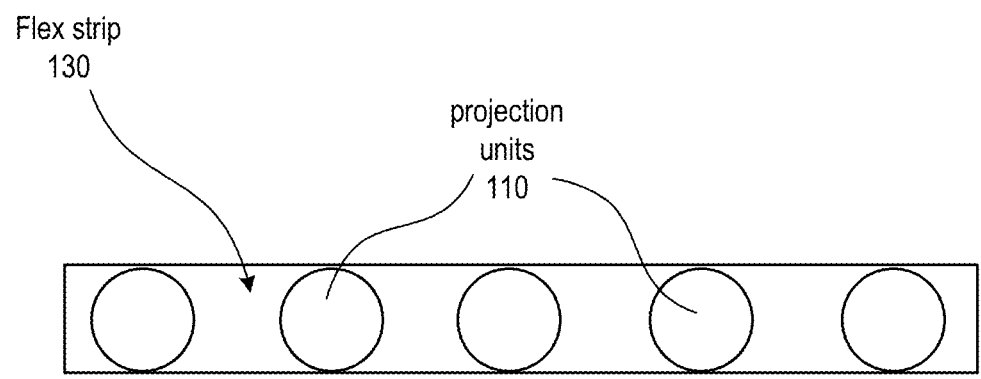

FIGS. 1E and 1F graphically illustrate a flex strip 130 with multiple projection units 110 attached to the strip 130. FIG. 1E shows a side view of a flex strip 130 bent to conform to a convex surface. Note, however, that a flex strip 130 may be conformed to a concave or flat surface, or to an irregular surface. FIG. 1F shows a top view of the flex strip 130 of FIG. 1E. While this example shows five projection units 110 on the strip 130, there may be more or fewer modules 110 on a strip 130. In some embodiments, two or more strips 130 may be connected to cover a given shape of a spatial light system. In some embodiments, a strip 130 may include one or more sensor modules as well as projection units 110 that collect data about the room that can be used to generate room information (e.g., surface depths, lighting, specular surfaces, motion, object detection and identification, etc.). The room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system.

As shown in FIGS. 1A, 1C, and 1E, the side of the projection units 110 that contain the LED array 114 and that are connected to the flex strip 130 may be referred to as the object side of the modules 110, while the side of the projection units 110 that contain the condenser lens 118 and from which light is emitted may be referred to as the image side of the modules 110.

Figure 1G:
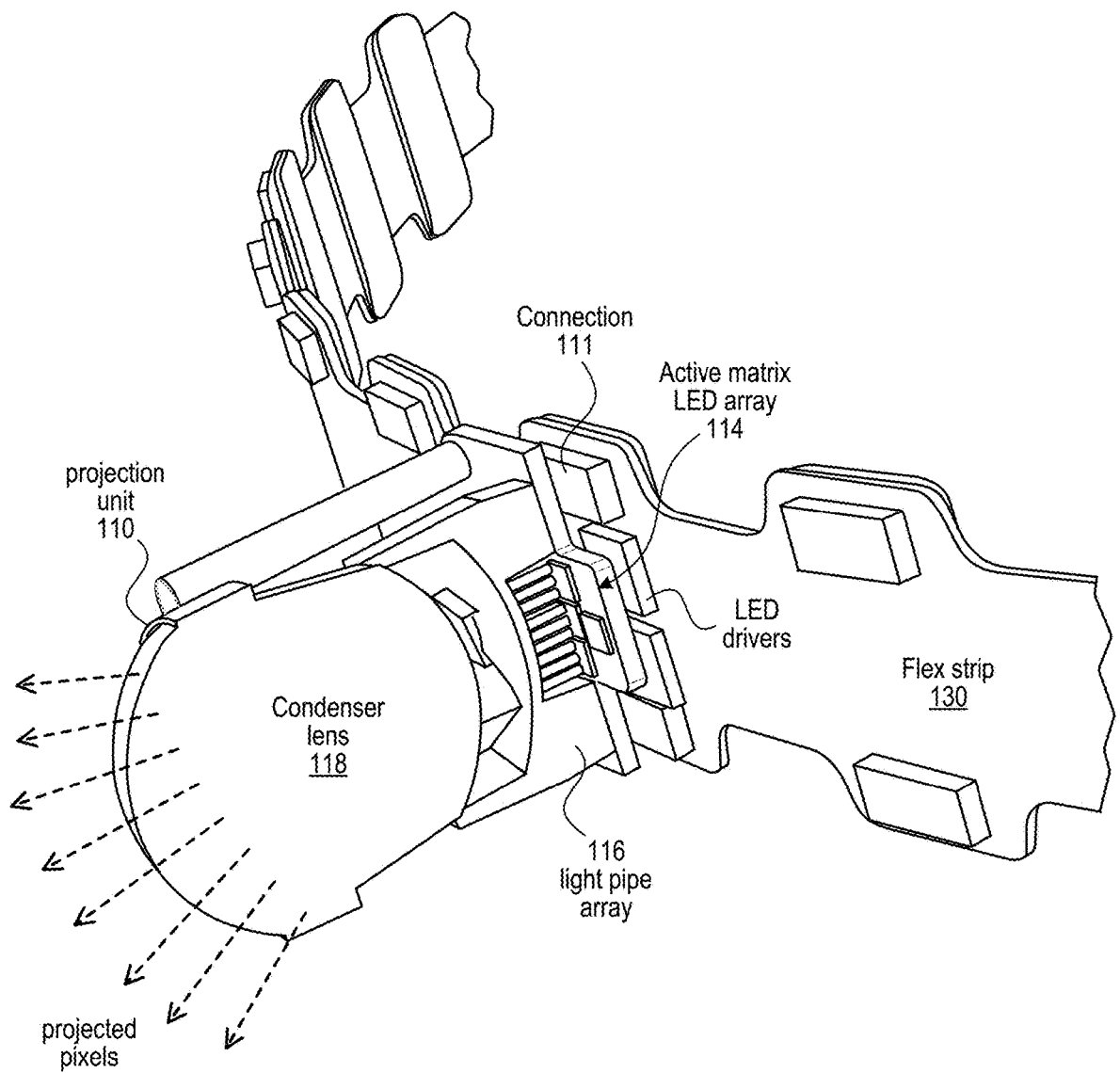

FIG. 1G shows an example 3D view of an example projection unit 110 as illustrated in FIGS. 1A through 1F, according to some embodiments. The projection unit 110 includes, but is not limited to, an active matrix LED array 114 mounted on a PCB base that includes one or more LED drivers, a light pipe array 116, and a condenser lens 118. The PCB base connects 111 to the flex strip 130. The LEDs in the active matrix LED array 114 selectively emit light beams into the light pipes of the light pipe array 116 under control of a controller; the light pipes guide or shape the light beams emitted by the LEDs and emit the light beams towards the condenser lens 118. The condenser lens 118 affects the emitted light beams received from the light pipes and projects the light beams onto a surface. Each projected light beam may form a pixel or a portion of a pixel of an image or other content on the surface.

FIGS. 2A through 4C illustrate example configurations for spatial light systems that use the projection units as illustrated in FIGS. 1A through 1G, according to some embodiments. These configurations are given by way of example, and are not intended to be limiting.

Figure 2C:
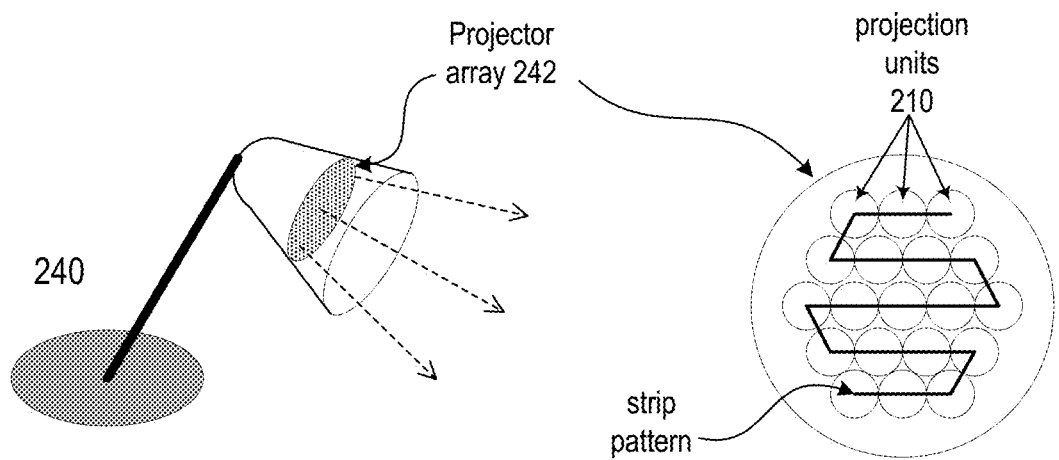
Figure 2C:
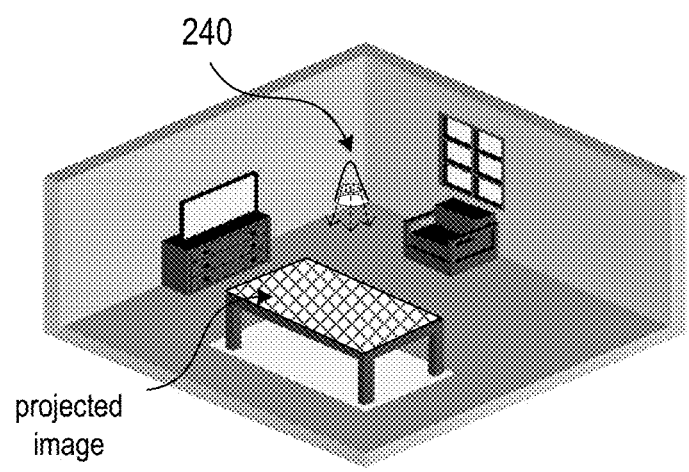

FIGS. 2A through 2C illustrate a lamp 240 configuration for a spatial light system, according to some embodiments. FIG. 2A shows a lamp 240 that may, for example, be used to project images onto the surface of an object such as a table, as shown in FIG. 2C. The lamp 240 may include a projector array 242 as shown in FIG. 2B that includes multiple projection units 210 on flex strip(s) that are arranged in a pattern, in this example a zigzag pattern. FIG. 2A shows an example lamp 240 on a stand; however, a lamp 240 may be hung on a ceiling as shown in FIG. 2C, or mounted on a wall or other object within a room.

Figures 3A, 3B:
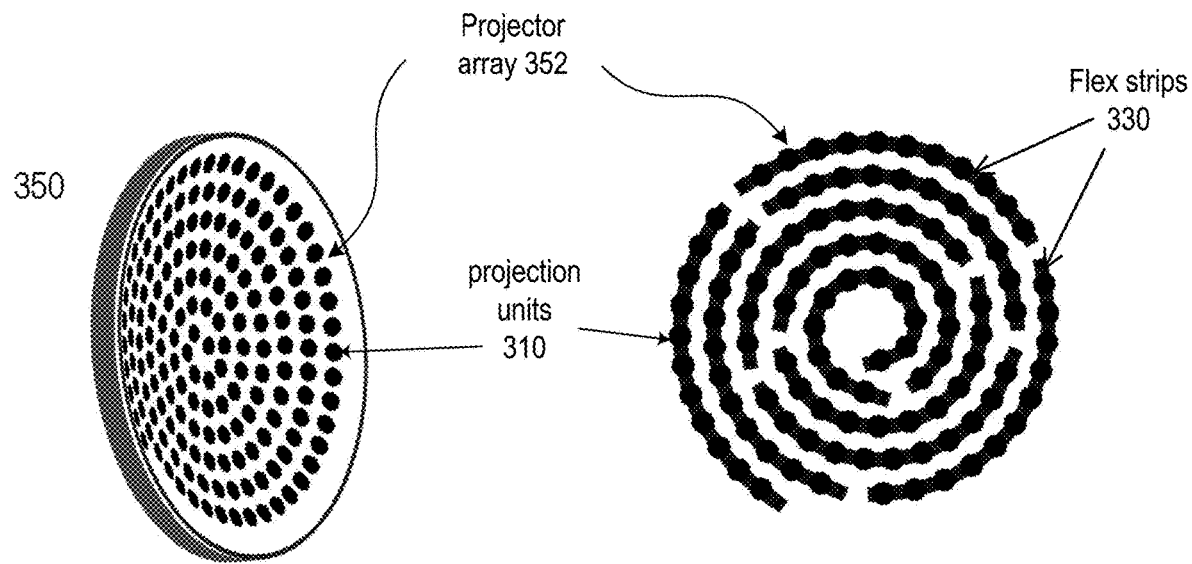
FIGS. 3A through 3C illustrate a disk configuration for a spatial light system, according to some embodiments.
Figure 3C:
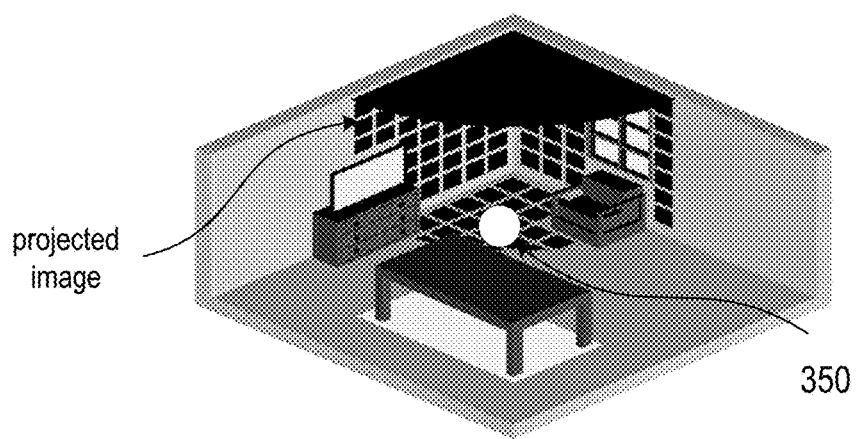

FIGS. 3A through 3C illustrate a disk 350 configuration for a spatial light system, according to some embodiments. FIG. 3A shows a disk 350 that may, for example, be used to project images into a corner of a room, as shown in FIG. 3C. The disk 350 may include a projector array 352 as shown in FIG. 3B that includes multiple projection units 310 on flex strip(s) 330 that are arranged in a pattern, in this example a spiral pattern. Disk 350 may be hung from a ceiling; however, a disk 350 may be mounted on a stand, or mounted on a wall or other object within a room.

FIGS. 4A through 4C illustrate a cylinder 460 configuration for a spatial light system, according to some embodiments. FIG. 4A shows a cylinder 460 that may, for example, be used to project images onto the walls of a room, as well as onto other objects or surfaces, as shown in FIG. 4C. The cylinder 460 may include a projector array 452 as shown in FIG. 4B that includes multiple projection units 410 on flex strip(s) 430 that are arranged in a pattern, in this example a vertical pattern. Cylinder 460 may be hung from a ceiling; however, a cylinder 460 may be mounted on a stand, or positioned on another object within a room.

Figures 5A, 5B:
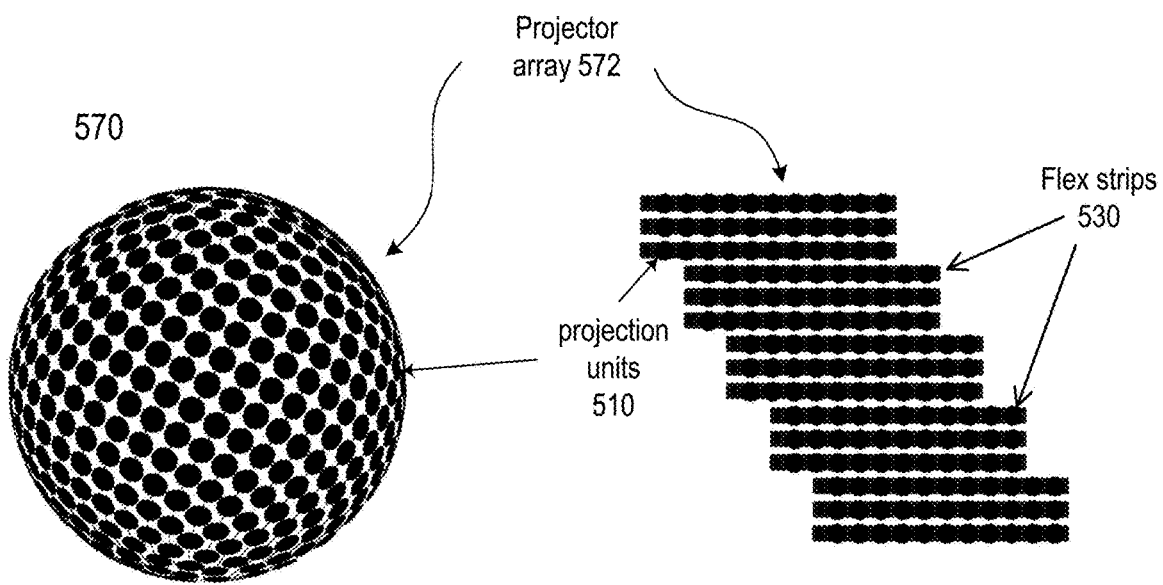
FIGS. 5A through 5C illustrate a sphere configuration for a spatial light system, according to some embodiments.
Figure 5C:
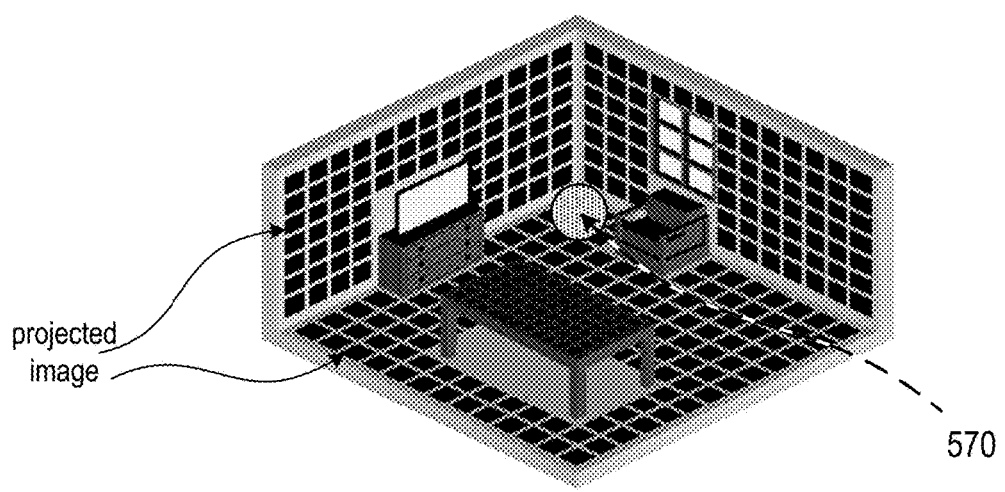

FIGS. 5A through 5C illustrate a sphere 570 configuration for a spatial light system, according to some embodiments. FIG. 5A shows a sphere 570 that may, for example, be used to project images onto the walls, ceiling, and/or floor of a room, as well as onto other objects or surfaces, as shown in FIG. 5C. The sphere 570 may include a projector array 552 as shown in FIG. 5B that includes multiple projection units 510 on flex strip(s) 530 that are arranged in a pattern, in this example a horizontal pattern. Sphere 570 may be hung from a ceiling; however, a sphere 570 may be mounted on a stand, or positioned on another object within a room.

Figure 6:
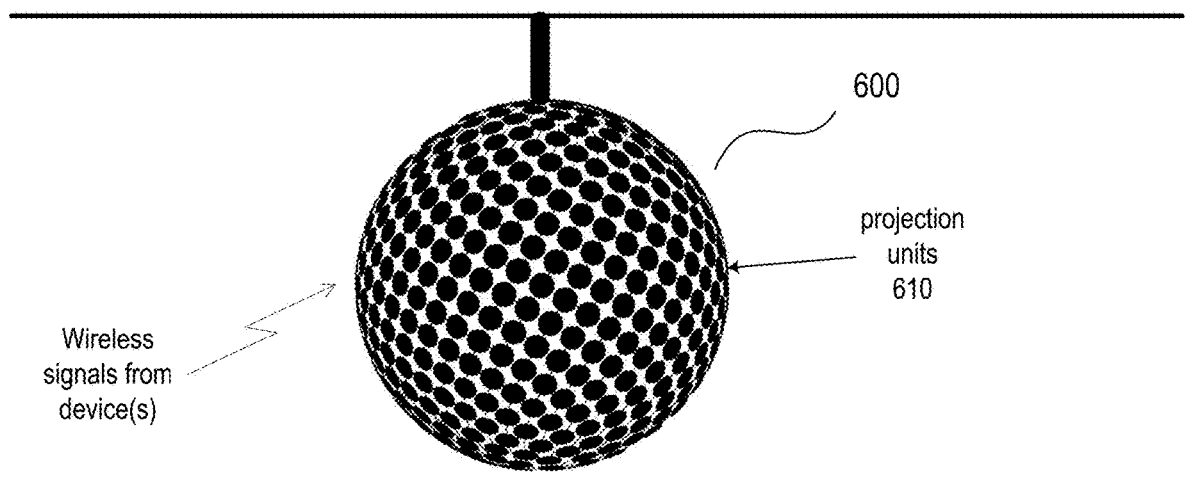
FIG. 6 illustrates an example spatial light system, according to some embodiments.

FIG. 6 illustrates an example spatial light system, according to some embodiments. This example shows a sphere-shaped system 600 as illustrated in FIGS. 5A through 5C; however, the description applies to any configuration. In this example, system 600 is hung from a ceiling, and includes multiple projection units 610. System 600 may receive wireless signals from other devices, for example from smartphones, tablet or pad devices, laptops or other computer systems, AR/VR systems, or other smart devices such as televisions.

System 600 may include a controller comprising one or more processors to which projection units 610 are connected, for example via flex strips as described herein. The controller may drive or control the projection units 610 on the flex strips to emit light into a room according to image content and room information. In some embodiments, the controller may also be configured to cooperate with one or more other systems 600 in a room to collaboratively control lighting within the room. In some embodiments, two or more systems 600 in a room may communicate via pulsed visible or non-visible light signals to exchange information used in collaboratively controlling lighting within a room.

The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the system 600. In these embodiments, the system 600 controller may be relatively simple, projecting images onto surfaces based on the room information obtained from an external device. In some embodiments, the room information may be generated by the system 600 controller from data obtained from one or more sensor modules of the system 600, for example sensor modules coupled to the flex strips on which the projection units 610 are coupled. In these embodiments, the system 600 controller may be relatively more complex to provide the needed processing power.

Image content to be projected by system 600 may be obtained from an external device, for example via a wireless connection to the system 600, or alternatively may be generated based on image information stored locally in memory of the system 600. In some embodiments, the system 600 may provide room illumination, as per conventional room lighting (e.g., light fixtures or light bulbs), as well as projecting AR or other imagery onto one or more surfaces in the room. System 600, for example, may project illuminating light, AR imagery, patterns, or other image content onto the floor, walls, and/or ceiling of a room. However, the system 600 may also intelligently light or augment particular objects found within a room, and/or intelligently not illuminate certain surfaces or objects such as windows or television screens, or persons, within a room, based on the room information obtained from an external device or generated by the system 600 controller from data collected by sensors of the system 600.

In some embodiments, the room information may be used by the spatial light system 600 to detect surfaces, objects, and motion within a room, and may also be used to identify particular objects including but not limited to specular surfaces such as mirrors, windows, and television screens, and persons within the room. This information may be used to adjust projection of light from the spatial light system 600. For example, upon detecting a person within the room, the spatial light system 600 may lower the intensity of the light projected towards that person by one or more of the projection units 610 to avoid "dazzling" the person with intense light. As another example, the spatial light system 600 may adjust one or more of the projection units 610 to focus the projected imagery at different depths as detected by the sensors. As yet another example, the spatial light system 600 may lower the intensity of projected light, or not project light, towards a reflective surface to avoid unwanted reflective light from the reflective surface. As still yet another example, the spatial light system 600 may project light towards an identified object or objects within the room to intentionally highlight or "spotlight" those objects.

In some embodiments, the system 600 may project 2D images of AR or other image content onto surfaces in the room, for example at least portions of the walls, ceiling, and floors, or onto objects within the room. In some embodiments, the image content projected by the system 600 may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the system 600 may also be configured to emit diffuse light to illuminate a room when not emitting light representing AR or other image content.

In some embodiments, the system 600 may be configured to pulse light at a frequency that is not detectable to the human eye; the pulsed light can carry information about the system 600 to one or more other spatial light systems or other devices in a room. The information conveyed may, for example, include information about the system 600's location in the room, current intensity, or any other relevant information about the system 600 and room environment that the spatial light systems in a room need to operate collaboratively. Further, the system 600 may include light sensors to receive pulsed light signals from other devices in a room, and the system 600 controller may be configured to generate and interpret the pulsed light signals. Note that visible or non-visible wavelengths of light, or both, may be used as a pulsed light information transfer medium.

FIGS. 7A through 7F illustrate embodiments of an AR projector system that uses a composable light emitter module to implement a custom light source, according to some embodiments.

Figure 7A:
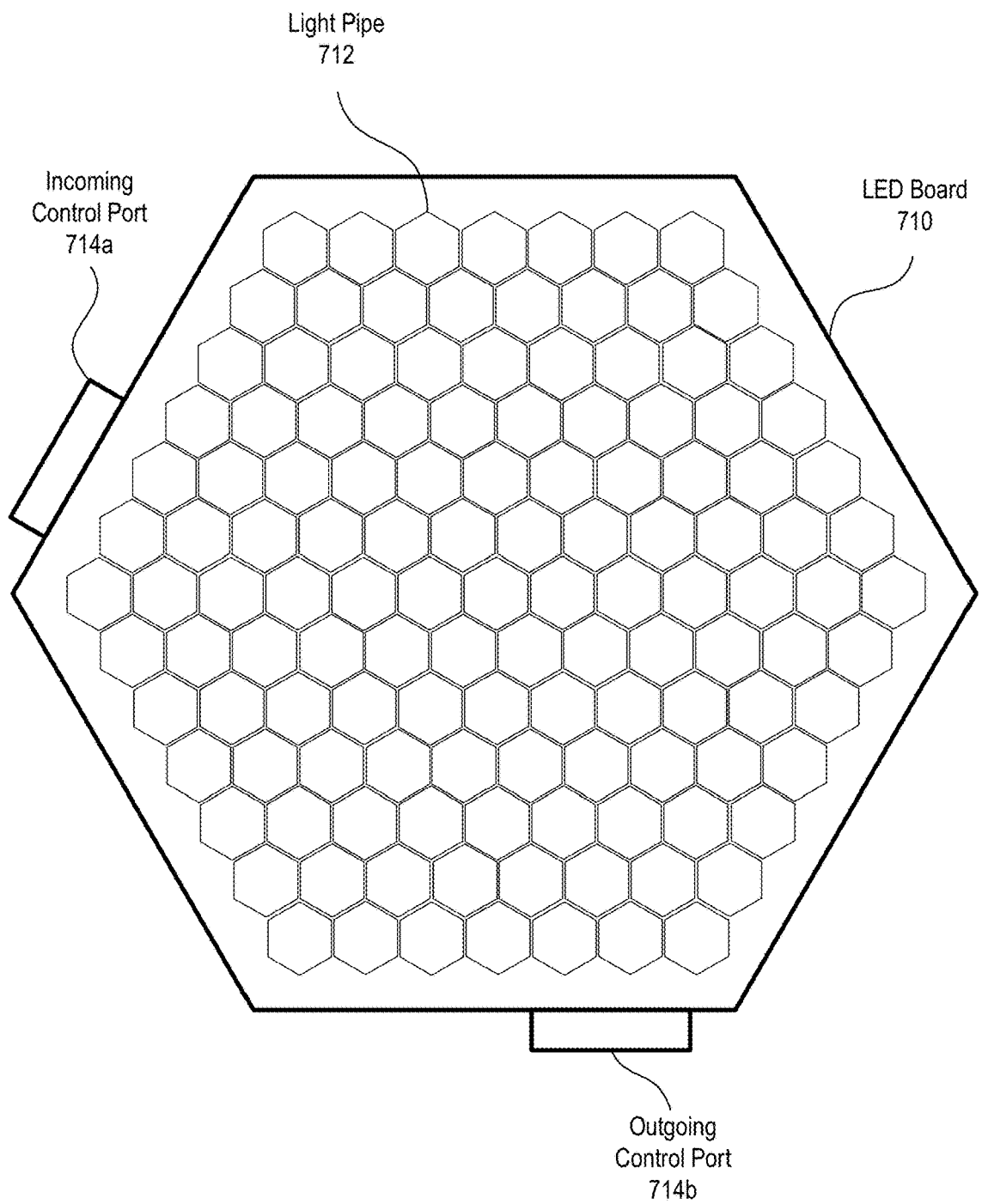
FIGS. 7A through 7F illustrate embodiments of an AR projector system that uses a composable light emitter module to implement a custom light source, according to some embodiments.

FIG. 7A shows an embodiment of a composable light emitter module 700 that can be used to implement custom light sources. As shown, the light emitter module 700 is implemented on a LED board 710 with a number of light pipes 720. The light pipes 720 may be straight extrusions on the LED board, and may be created using a specular 3D printing process. These light pipes may be used to guide light generated by LEDs on the LED board into a projection lens. In some embodiments, each light pipe 720 may function as an individual projection unit of the projection system. In some embodiments, the light pipes may create light beams that are used to form pixels in a projected image. In some embodiments, the light pipes 720 may be implemented using the light pipe array 116 of FIG. 1A, and the LEDs may be implemented using the active matrix LED array 114 of FIG. 1A. In some embodiments, the light pipes may be configured to mix different colors from the LEDs to produce RGBW or RGBA lighting.

In other embodiments, the light pipes 720 may be in the form of molded fiber optic elements comprised of smaller fiber elements that each have an inner core material with a relatively high index of refraction, surrounded by a cladding material with slightly lower refractive index so as to maintain total internal reflection within each fiber element within the structure, independent from the fiber element's shape or proximity to other fibers elements. In some embodiments, these fibers could be fused together using an optical inert binder material so as to create a particular shape or form. Regardless of shape, light that is incident on the input face propagates efficiently to the output face, while changing the size and shape as defined by the shape of the molded fiber structure. Depending on the embodiment, the individual fiber elements could be round, hexagonal, or some other shape as required for optimum packing so as to maximize fill factor. The input and output faces of the molded fiber structure may be flat, curved, or some other shape.

The composable light emitter module 700 may be combined with other composable light emitter modules to create a variety of custom light sources. In this example, the module is shaped as a regular hexagon, so that it can be easily combined with other hexagonal modules. However, as may be appreciated, other module shapes (e.g. squares or triangles) may also be used. The module 700 in this example includes an incoming control port 730a and an outgoing control port 730b. These ports may be used to connect together several modules, so that they can all be controlled by a single controller. In some embodiments, the modules may be connected in a serial chain, where the module 700 receives control signals from an upstream module or the controller itself via the incoming control port 730a, and transmits the control signals to a downstream module via the outgoing control port 730b. In some embodiments, the control ports 730 may implement a serial digital interface (SDI).

Use of composable light emitter modules such as module 700 provides a number of technical advantages. First, these modules are smaller and less complex than larger custom light source systems, so they can be easily manufactured using standard processes. The smaller modules are more predictable in terms of heat dissipation characteristics, making them easier to manage from a thermal management standpoint. Second, these modules may be arranged in arbitrary ways to optimize how light is emitted into the projection lens. For example, module 700 may be used to implement the disk light source of FIGS. 3A-3C, the cylindrical light source of FIGS. 4A-4C, or the spherical light source of FIGS. 5A-5C. The modules may be used to create light sources with very wide fields of projection and high optical efficiency (e.g. avoiding the use of additional lenses to redirect emitted light). In some embodiments, depth/structure sensing may be used to compensate for parallax errors or overlap between multiple light emitter modules. Finally, the modularization of the light source allows the projector system to be repaired more cheaply. When a LED fails, only one module needs to be replaced instead of the entire light source assembly.

Figure 7B:
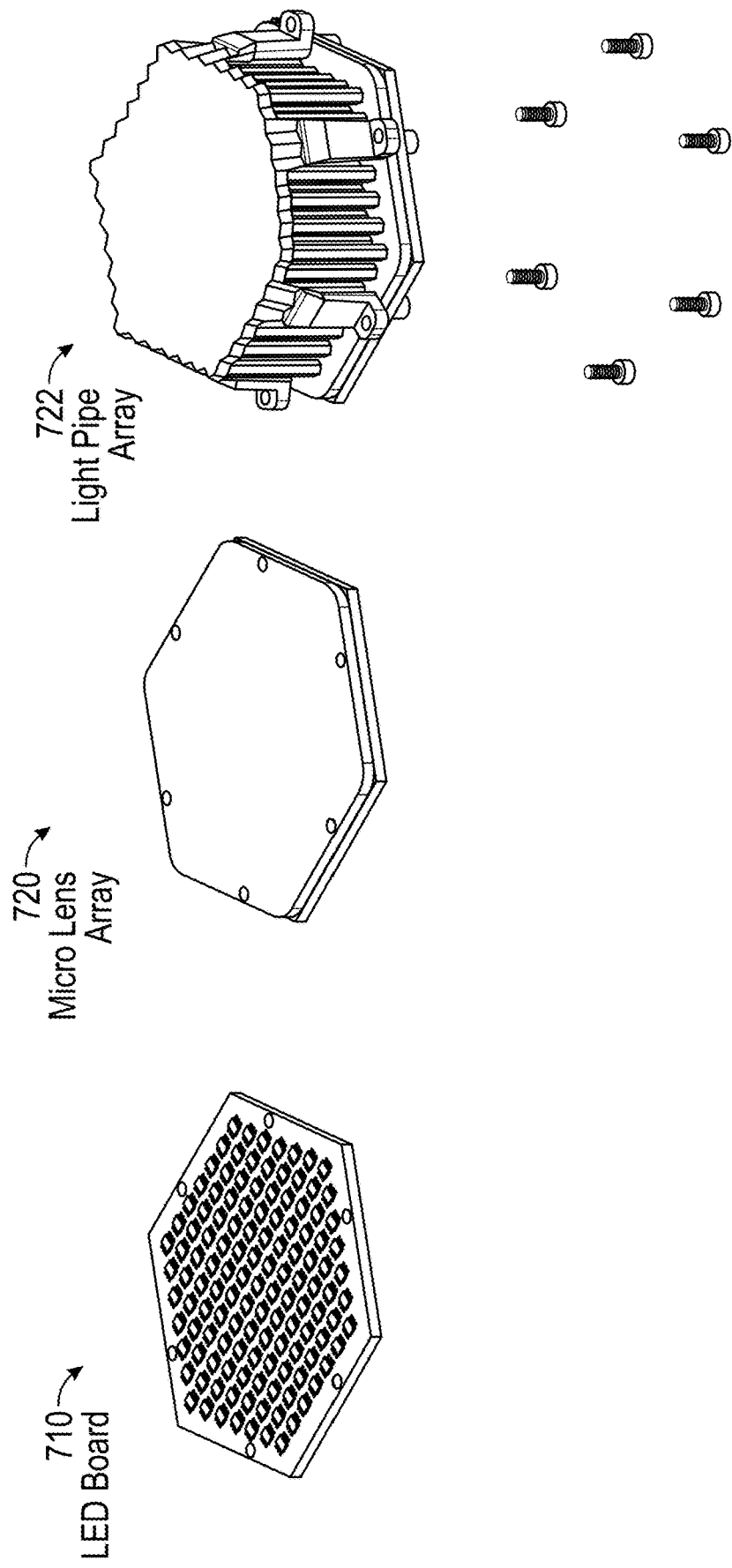
Figure 7C:
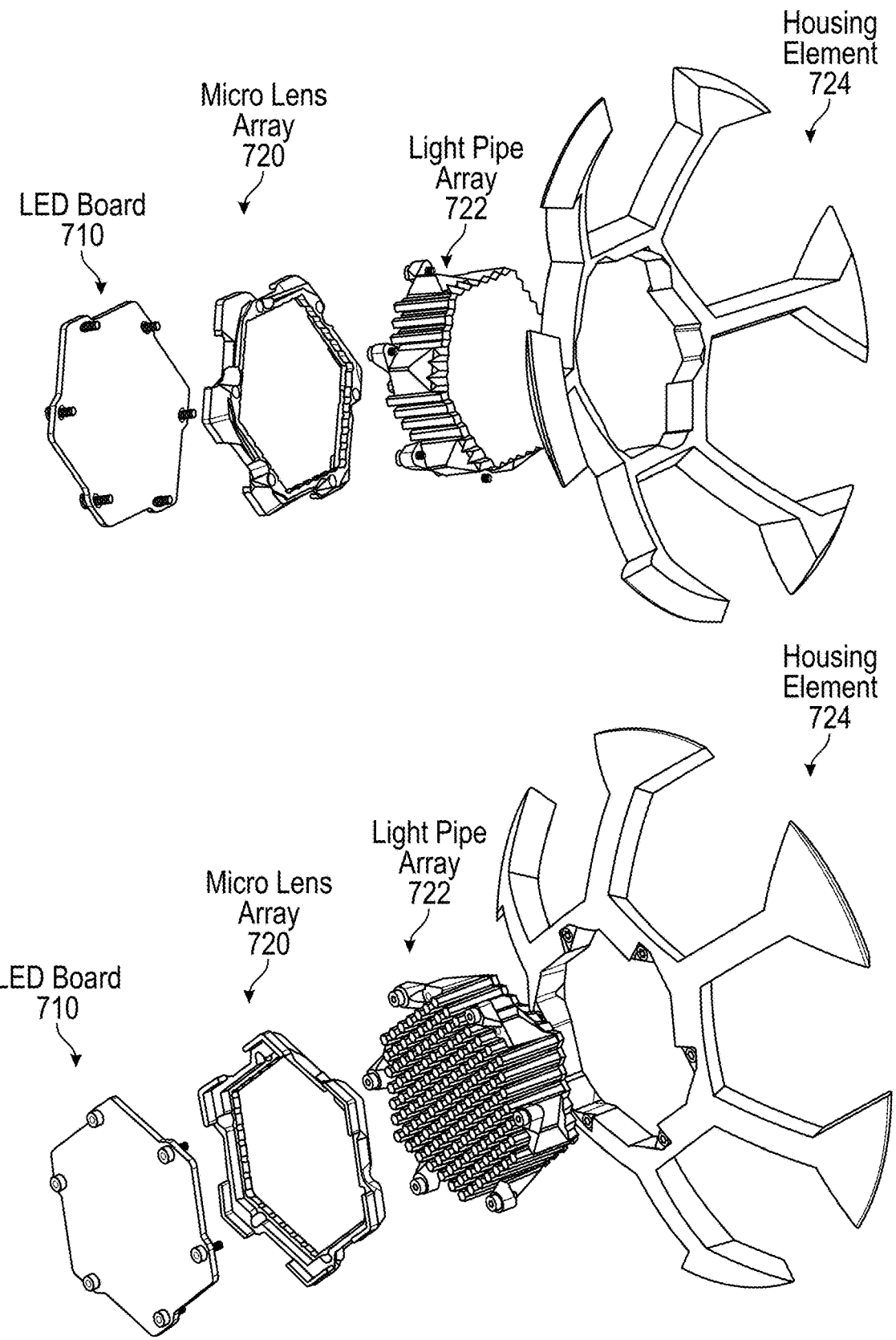

FIGS. 7B and 7C show components used in embodiments used in the manufacture of a composable light emitter module 700. As shown, the module includes the LED board 710. The board 710 may be coupled to a micro lens array 720, which may be used to filter out undesirable light emitted by the LEDs and control how light from neighboring LEDs is blended. A light pipe array 722 is then installed on top of the micro lens array 720 to direct the light to the projection lens. In some embodiments, the light pipe array will contain many individual light pipes 712, as discussed in connection with FIG. 7A. In some embodiments, these three optical layers may be combined using fasteners, as shown. The entire assembly is then fitted inside a housing element 724, which may be used to add other module elements such as the control ports 714 or reflectors, and gives the module its hexagonal shape.

Figure 7D:
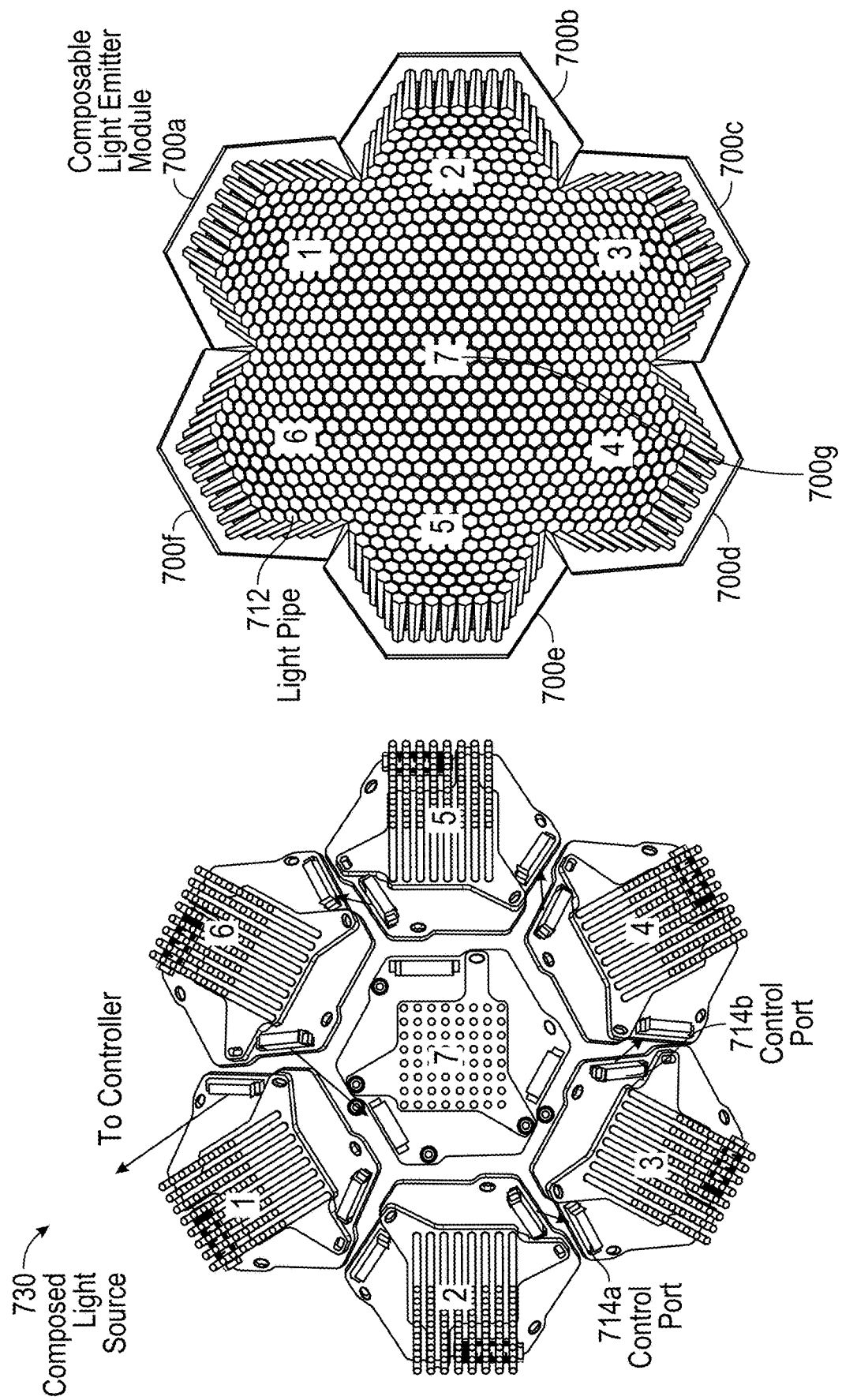

FIG. 7D shows a light source 730 that is composed using multiple composable light emitter modules 700a-g. As shown in this example, the arrangement involves seven hexagonal modules 700a-g, including a center module 700g and six modules 700a-f positioned on each side of the center module. As shown, the modules 700a-g are connected in a series via their respective control ports 714, so that they can receive control signals from a single controller. Light source 730 may be optimized to emit light into a spherical or ball lens, where each module is positioned around the lens to approximate a curved emission surface facing the lens. In some embodiments, the brightness of the individual projection units in the module may be programmatically controlled to better approximate the curved emission surface. For example, LEDs that are slightly closer to the lens (e.g. those at the center of the hexagonal module) may be configured to emit with less intensity.

Figure 7E:
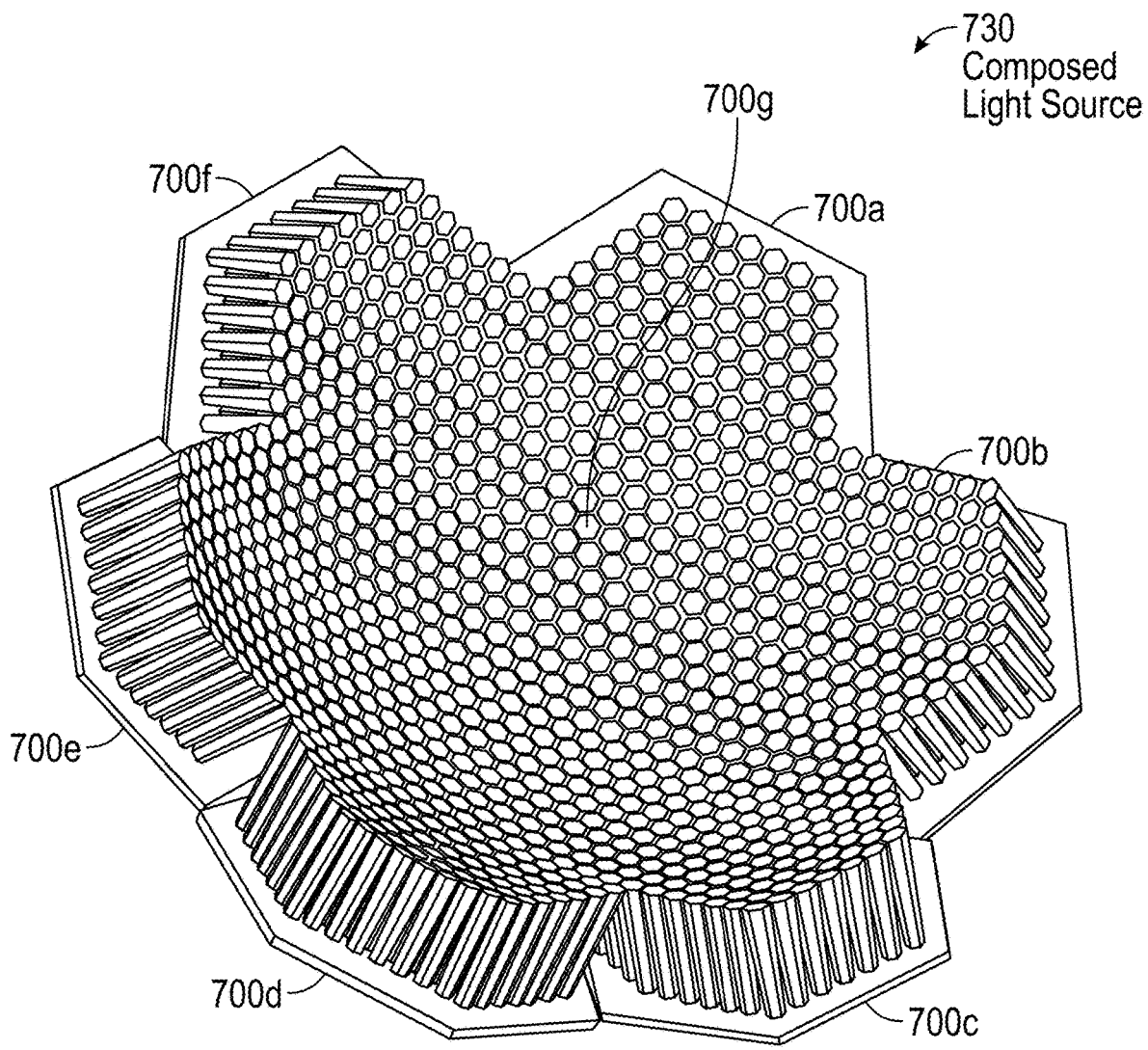

FIG. 7E shows a depiction of one embodiment of the light source 730. In this embodiment, each of the module 700a-g includes 127 LEDs, which provides a total of 889 individually addressable LEDs for the light source.

Figure 7F:
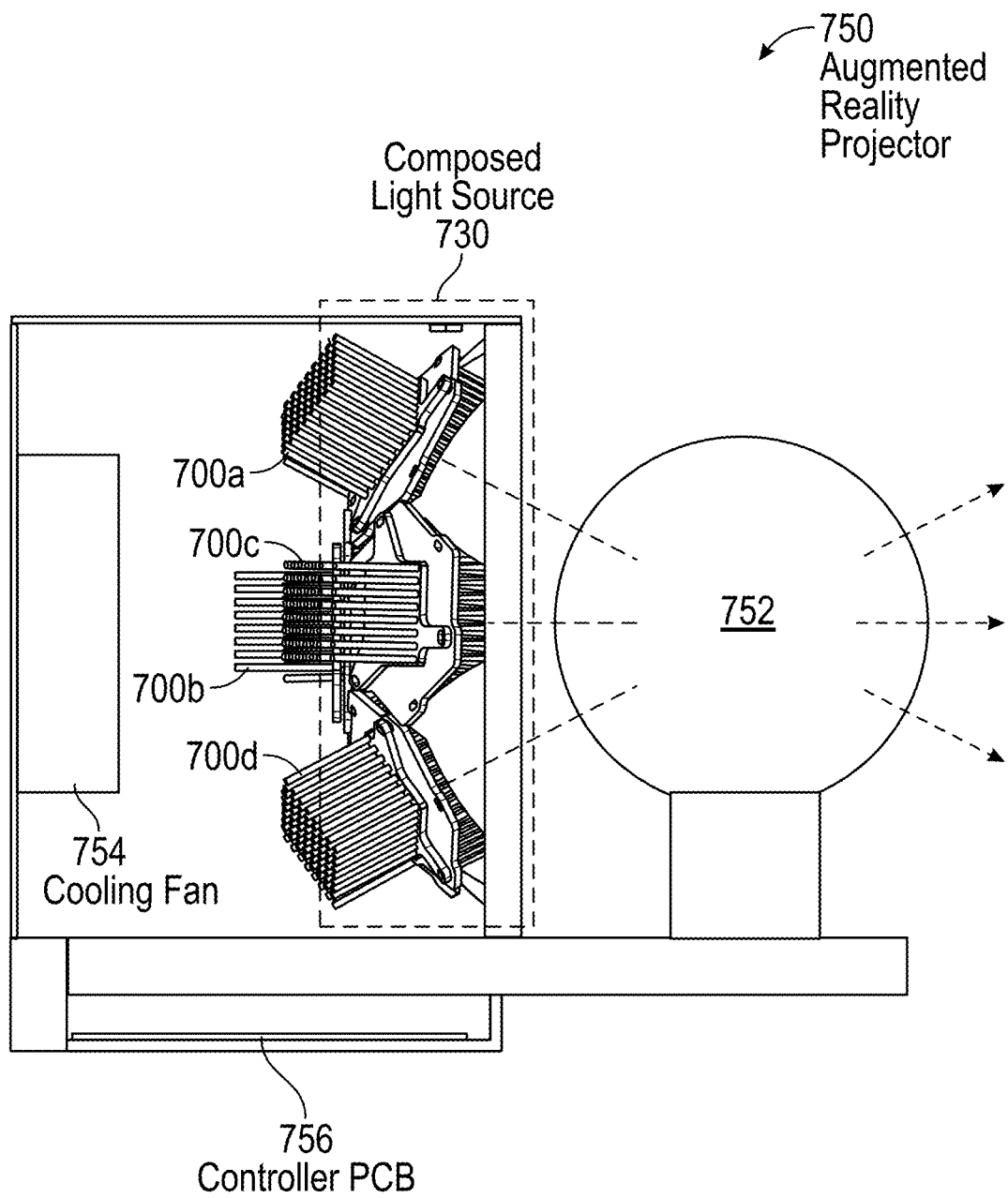

FIG. 7F shows an embodiment of an AR projector 750, which may be another type of spatial light system. As shown, projector 750 uses the composed light source 730 created using multiple composable light emitter modules 700. As shown, the light emitter modules are positioned around a spherical lens 752. In one embodiment, the light source 730 is positioned to provide a high optical efficiency (70-80%) and a fairly large field of projection (approximately 90°). Though not shown in the figure, a number of variations of the projector 750 may be implemented. For example, in some embodiments, the projector may employ multiple projection units (e.g. projection units 110 of FIG. 1A), where each unit has a separate projection lens 752 and light source 730. In some embodiments, the projector 750 may employ a flex board as the light source substrate instead of multiple composable light emitter modules 700. In some embodiments, the projector 750 may be equipped with sensors (e.g. LIDAR sensors) that can collect spatial information about the projector's surrounding environment. This spatial information may be used by the controller to dynamically change the content produced by the projector. In some embodiments, these sensors may be implemented as part of the light source 730, for example, taking up one or more light pipe slots in the light emitter modules 700. As shown, in some embodiments, the spatial light system may include a cooling fan 754 and controller circuit board 756.

Figure 8A:
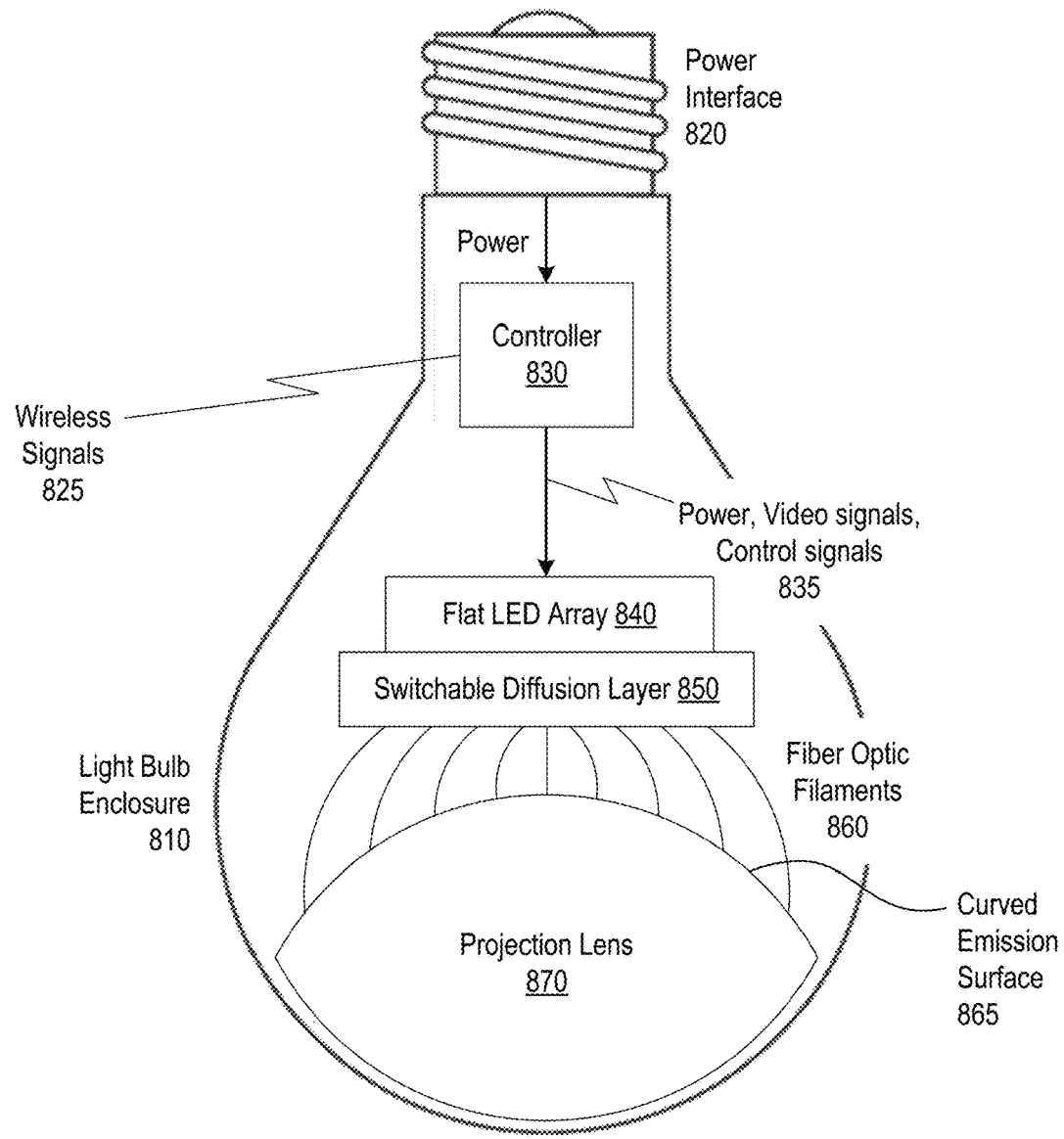
FIGS. 8A through 8B illustrate embodiments of an AR projector system implemented in the form of a light bulb, according to some embodiments.
Figure 8B:
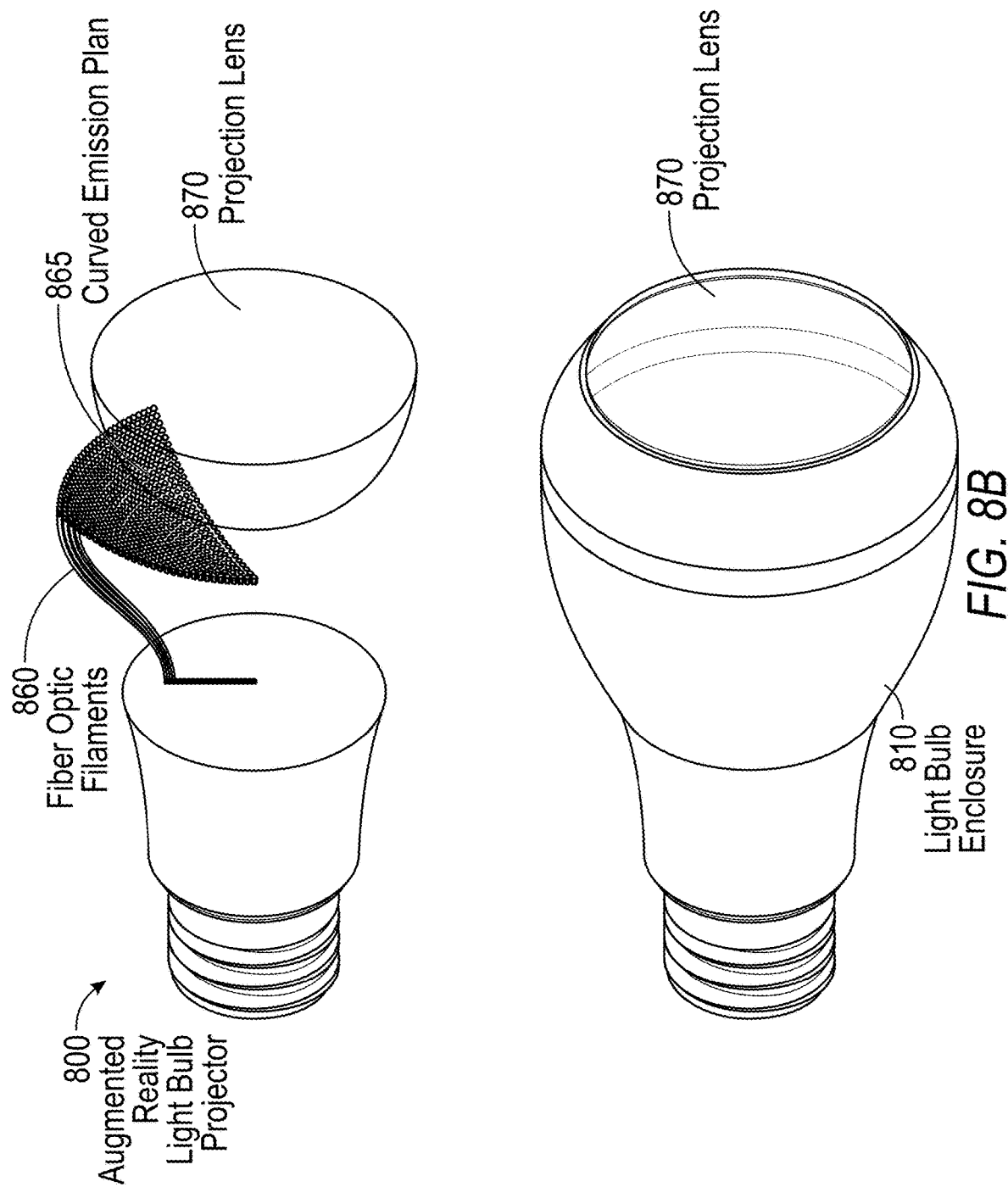

FIGS. 8A through 8B illustrate embodiments of an AR projector system implemented in the form of a light bulb, according to some embodiments.

FIG. 8A depicts an AR light bulb projector 800, which may be another type of spatial light system. As shown, the projector 800 is implemented in the shape of a light bulb. In some embodiment, the projector 800 is packaged or contained within a light bulb enclosure 810 or "bulb-like" structure of a transparent or semi-transparent material (e.g., glass or plastic). In some embodiments, the projector 800 may be connected to electrical power, for example via a power interface 820 that can be connected to a conventional light socket or powered via a conventional power plug. For example, embodiments of the projector 800 may be hung from a ceiling, mounted on a lamp fixture, or used in a flashlight.

As shown, embodiments of the light bulb projector 800 may include a controller 830 that receives power from the light bulb socket interface and provides power, video, and/or control signals 835 to an LED array 840. In some embodiments, the controller 830 may include wireless technology that enables wireless signals 825 to be received and/or sent by the system 800 from/to other devices, such as a remote control, an AR/VR system (e.g., an AR/VR headset or glasses) or a mobile multipurpose device such as a smartphone, pad or tablet device. In some embodiments, the projector 800 may instead or also include technology that enables wired connection between the system 800 and other devices.

In some embodiments, an external device such as a smartphone or remote control may be used to control the projector 800 via the controller 830. Such external devices may provide applications or interfaces to allow a user to, for example, switch the light bulb projector on and off, adjust the brightness or color of light produced by the projector, move a spot light generated by the projector, switch between projecting virtual content and room illumination, select video content to be displayed by projector, and so on. In some embodiments, the controller device may be a computer device that is configured to receive and carry out voice commands from the user.

In some embodiments, the light bulb projector 800 is operable to project low-resolution pixelated content onto surfaces in a room. As with AR projector 750, the light bulb projector 800 may be used to implement various lighting applications such as mood lighting, content augmentation, on-demand spot lighting, among others. In some embodiments, another device, such as an AR/VR system, HMD, or smartphone, may transmit low- and/or high-resolution content to the controller 830 via a wired or wireless connection. The controller 830 may then play the content on the LED array 840 so that the content is projected through the projection lens 870. In some embodiments, the augmented content may be generated automatically to accompany the content being played on the other devices. Such augmented content may be synchronized with the primary content.

In some embodiments, the light emitted by the flat LED array 840 may be implemented in similar fashion as in the AR projector 750 or the projection unit 110 of FIG. 1A. As shown, light emitted by the flat LED array 840 is transported to the projection lens 850 via a number of fiber optic filaments 860. In some embodiments, each fiber optic filament may function as an individual projection unit of the system, similar to the light pipes 712 of FIG. 7A. The filaments 860 may be arranged so that the LED light is transported in a curved emission surface 865 to deliver light to the projection lens 870, similar to the curved emission surface created by the composable light emitting modules 700.

In some embodiments, the projector 800 may implement a switchable diffusion layer 850. Diffusion layer 850 may be used to hide the effects of inter-pixel gaps produced by the projector 800, so that the projector can generate diffuse light similar to a normal light bulb. In some embodiments, the diffusion layer 850 is switchable by the controller 830, which is in turn be controlled by an external user control device. Thus, the projector 800 may operate under a first mode where the system emits diffuse light like a normal light bulb, and a second mode where the system does not diffuse light and projects pixelated content.

In some embodiments, the diffusion layer 850 may be implemented using polymer-dispersed liquid crystal (PDLC) technology, which can be used in materials such as glass or plastic to controllably change the transparency or transmittance of the material. In other embodiments, the diffusion layer 850 may be implemented using fast switching dual-frequency nematic liquid crystal technology. Depending on the embodiment, the diffuser mechanism may be implemented as an entire layer, small windows in front of individual LEDs, or part of the projection lens 850. If individual diffuser windows are used, in some embodiments, the controller 830 may be able to turn on diffusion for only a part of the light emitted by the projector.

Depending on the embodiment, the diffusion layer could be flat or curved. The diffusion layer 850 may be located between the LED array 840 and the lens 870, or in front of the lens 870. In some embodiments, the diffusion layer may be implemented as the outermost surface of the bulb (e.g. the light bulb enclosure 810), which may be a preferred implementation for simulating the diffuse effect from a traditional lightbulb or other traditional decorative light fixture. In some embodiments, the diffuser surface may serve to not only diffuse the light to simulate the traditional functionality of a lightbulb or light fixture, but can also be used as a display surface for producing patterned content directly within the device itself, such as numbers on a clock.

In some embodiments, other types of diffuser mechanisms may be used, such as one or more mechanical actuators, to focus and defocus the light produced by the projector. FIG. 8B provides additional depictions of an embodiment of the light bulb projector 800, showing how the fiber optic filaments 860 are used to create a curved emission plan 865 for the projection lens 870.

Figure 9A:
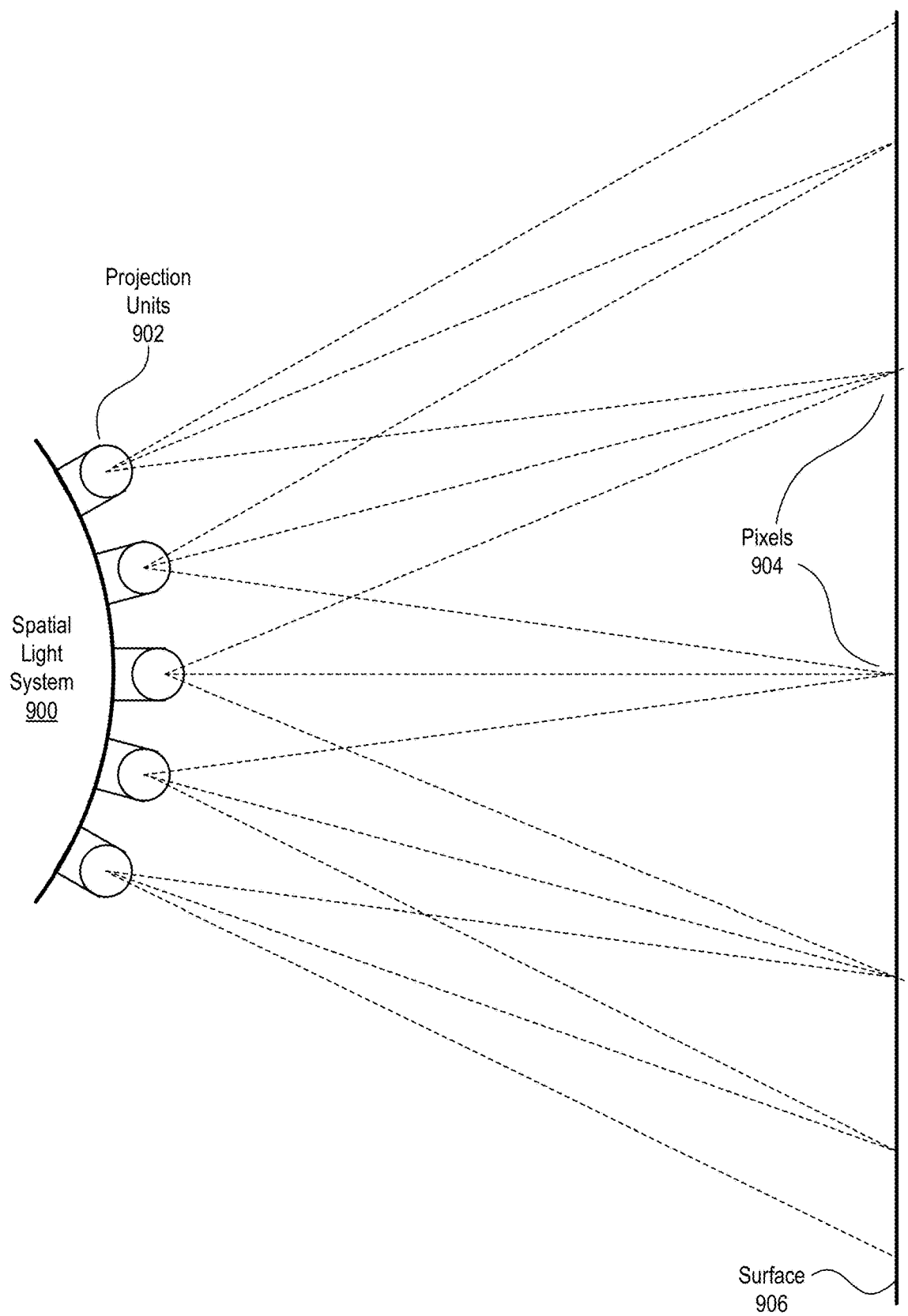
FIG. 9A illustrates a spatial light system projecting light onto a surface to generate pixels, according to some embodiments.

FIG. 9A illustrates a spatial light system projecting light onto a surface to generate pixels, according to some embodiments. The depicted spatial light system 900 may be any of the various light projection systems described previously. For example, system 900 may include a number of projection units 902 mounted on one or more flex strips, as described in connection with FIG. 1A. In other embodiments, system 900 may be the AR projector 750 of FIG. 7F, or the light bulb projector of FIG. 8A. In some embodiments, system 900 may be implemented using composable light emitter modules 700, as discussed in connection with FIGS. 7A-7C. As shown, the spatial light system 900 projects "pixels" 904 onto a surface 906 (e.g. a wall). In some embodiments, the light projected by a given projection unit 902 may overlap with the light projected by one or more other (typically adjacent) projection units 902 to form "pixels" on the surface 906 within a room, all under control of the spatial light system. Collectively the "pixels" form image(s) on the surface 906.

Figure 9B:
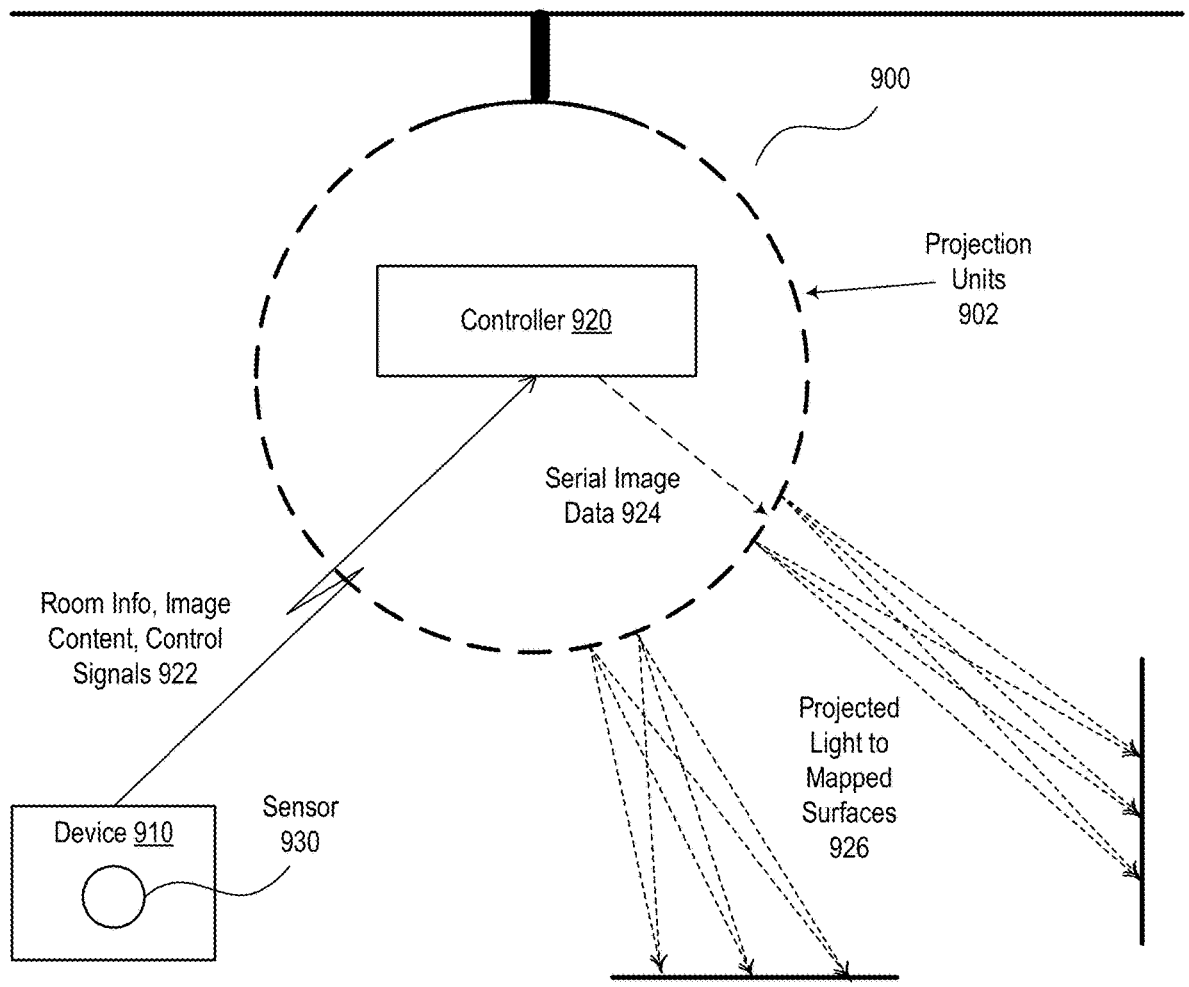
FIG. 9B illustrates components and operation of an example spatial light system that receives room information from an external device, according to some embodiments.

FIG. 9B illustrates components and operation of an example spatial light system 900 that receives room information from an external device, according to some embodiments. This example shows a sphere-shaped system 900 as illustrated in FIGS. 5A through 5C; however, the description applies to any light projection system described previously, including the AR projector 750 of FIG. 7F and the light bulb projector 800 of FIG. 8A. In this example, system 900 is hung from a ceiling, and includes multiple projection units 902. System 900 may receive wireless signals 922 from an external device 910, for example from a remote control, a smartphone, tablet or pad device, laptop or other computer system, an AR/VR system, or other smart device such as a television. The received wireless signals may include room information, image content, and/or control signals.

System 900 may include a controller comprising one or more processors to which projection units 902 are coupled, for example, via flex strips, composable light emitter modules, or fiber optic filaments, as described herein. The controller 920 may drive or control the projection units 902 to project light 926 onto room surfaces according to received image content and room information. The room information may be obtained from the device 910. The room information may include, but is not limited to, depth information (e.g. a depth map) for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 902 are to be focused, objects or surfaces to be illuminated or not illuminated, and so on. In some embodiments, the controller 920 may also be configured to cooperate with one or more other lighting systems 900 in a room to collaboratively control lighting within the room. In some embodiments, two or more systems 900 in a room may communicate via pulsed visible or non-visible light signals to exchange information used in collaboratively controlling lighting within a room.

In some embodiments, the room information may be captured using one or more sensor(s) 930 on the external device 910 (e.g. a smartphone), which may be paired with the projection system 900. The room information may be provided as a one-time step during an initial configuration of the system 900, be periodically pushed to the system 900 as the room changes, or continuously transmitted to the system 900 to provide a near real time view of the room. The sensor 930 may be used to collect spatial information about the room using a variety of techniques, including cameras, sound-based scanning techniques such as SONAR, or light-based techniques such as LIDAR, or a combination of these and other methods. In some embodiments, the room information may include depth information about the room (e.g. a depth map) that indicates how the system 900 is from different portions of the room. In some embodiments, device 910 may be configured to perform automated objection detection or recognition in the room (e.g. using machine learning models), and indicate the identified objects in the room information. In some embodiments, identified objects may be classified as movable objects (e.g. a person, a pet, a set of keys), or stationary objects (e.g. a wall, a window, a table). In some embodiments, the device 910 is able to accurately place the projection system 900 in the spatial model of the room (e.g. by scanning the room from multiple locations) and convey that information to the system 900. In some embodiments, the device 910 may automatically or allow a user to manually identify appropriate projection surfaces (mapped surfaces) in the room, such as walls, ceilings, floors, table tops, etc. The device 910 may allow a user to fine-tune how the system projects content onto these surfaces (e.g. any distortion or Keystone parameters, brightness and color parameters, light diffusion parameters, etc.), and provide these parameters as part of the room information. In some embodiments, the room information may include collected color and/or material information about one or more room surfaces, so that such information can be used to fine tune how lights is projected onto those surfaces (e.g. to ensure that the projected light color matches the intended color). The projection system 900 may store such information on a local persistent memory device, which will be used by the controller 920 when projection image content onto the surfaces.

In some embodiments, the image content to be projected by system 900 may also be obtained from an external device 910 (e.g. a smartphone or a TV), for example via a wireless connection to the system 900, or alternatively may be generated based on image information stored locally in memory of the system 900. The image content may be transmitted by the controller 990 projection units 920 as serial image data 924 or video content data, so as to cause the projection units to play the image or video content on the mapped surfaces.

In some embodiments, instead of or in additional to using wireless technology as a form a communication, the system 900 may be configured to pulse light at a frequency that is not detectable to the human eye to transmit information about the system 900 to one or more other spatial light systems or other devices in a room. The information conveyed may, for example, include information about the system 900's location in the room, the system 900's current knowledge about the state of the room, the current health or operating status of the system 900, or any other relevant information about the system 900 and room environment that the spatial light systems in a room need to operate collaboratively. Further, the system 900 may include light sensors to receive pulsed light signals from other devices in a room, and the controller 920 may be configured to generate and interpret the pulsed light signals. Note that visible or non-visible wavelengths of light, or both, may be used as a pulsed light information transfer medium.

Figure 9C:
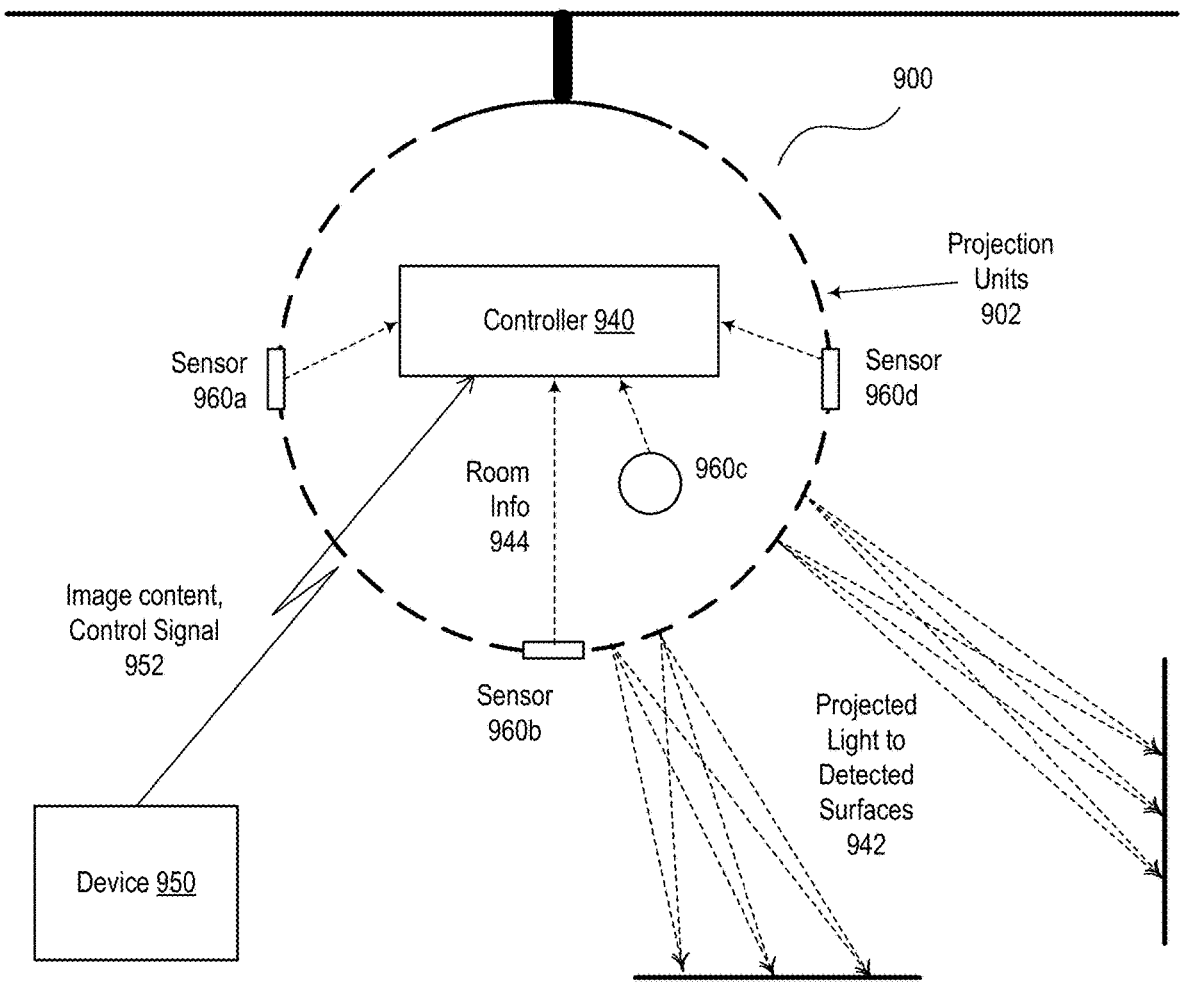
FIG. 9C illustrates components and operation of an example spatial light system that includes sensors that collect data from which room information is generated, according to some embodiments.

FIG. 9C illustrates components and operation of an example spatial light system that includes sensors that collect data from which room information is generated, according to some embodiments. This example shows a sphere-shaped system 900 as illustrated in FIGS. 5A through 5C; however, the description applies to any light projection system described previously, including the AR projector 750 of FIG. 7F and the light bulb projector 800 of FIG. 8A. As in FIG. 9B, this embodiment of system 900 in this example is hung from the ceiling and includes multiple projection units 902. System 900 may include a wireless interface to receive image content or control signals 952 from an external device 950. Similar to the embodiment of FIG. 9B, the image content may be received by the controller 940 of the projection system and projected 942 to surfaces in the room. Examples of the external device 950 may include a smartphone, tablet or pad device, laptop or other computer system, an AR/VR system, or other smart device such as a television. In some embodiments, additional image content may be generated within the projection system 900, for example, by the controller 940 itself, or stored in a persistent memory device of the system 900.

In some embodiments, room information 944 may be generated by the system 900 from sensor data obtained by one or more sensor modules 960a-d of the system 900. The sensors 960 may be coupled to the projection system in various ways, for example, to the flex strips on which the projection units 910 are coupled, to a composable light emitter module 700 replacing one of the light pipes, or to an exterior enclosure of the projection system (e.g. light bulb enclosure 810). The room information 944 may include all types of room information captured by sensor 930 of FIG. 9B, which may include depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information 944 may be used to determine direction and depths at which "pixels" projected by the projection units 902 are to be focused, objects or surfaces to be illuminated or not illuminated, and so on.

In some embodiments, one of the sensors 960 may be a camera for tracking objects or persons within a room. For example, in some embodiments, at least one of the projection units 902 may include an embedded camera. In some embodiments, the embedded camera may be confocal with the light projection mechanism of the projection unit 902; that is, the camera uses the same optical path as the light projection mechanism of the projection unit 902 to capture images or video of a portion of a room. Tracking an object or person may, for example, allow the spatial light system to project light with respect to a moving object or person to augment that object or person, for example to project a moving "spotlight" in front of a person in a room. In some embodiments, the system 900 may track a person's face in the room so that light is not directly projected into the person's face. In some embodiments, the system 900 may be configured to recognize objects (e.g. a set of keys) within a room, and shine a spotlight on an object when requested by a user (e.g., via a voice control interface). In some embodiments, the sensors 960 may be activated on-demand to perform a full scan of the room, for example, during an initial configuration of the system 900. The scan may allow the system 900 to identify potential projection surfaces in the room, and allow the user to label these detected surfaces and configure how light should be projected onto these surfaces. In some embodiments, this configuration process may be interactive, where the projection system asks the user certain configuration questions via a projected user interface on a surface, and the user responds to the questions via voice command or a remote control.

Figure 10:
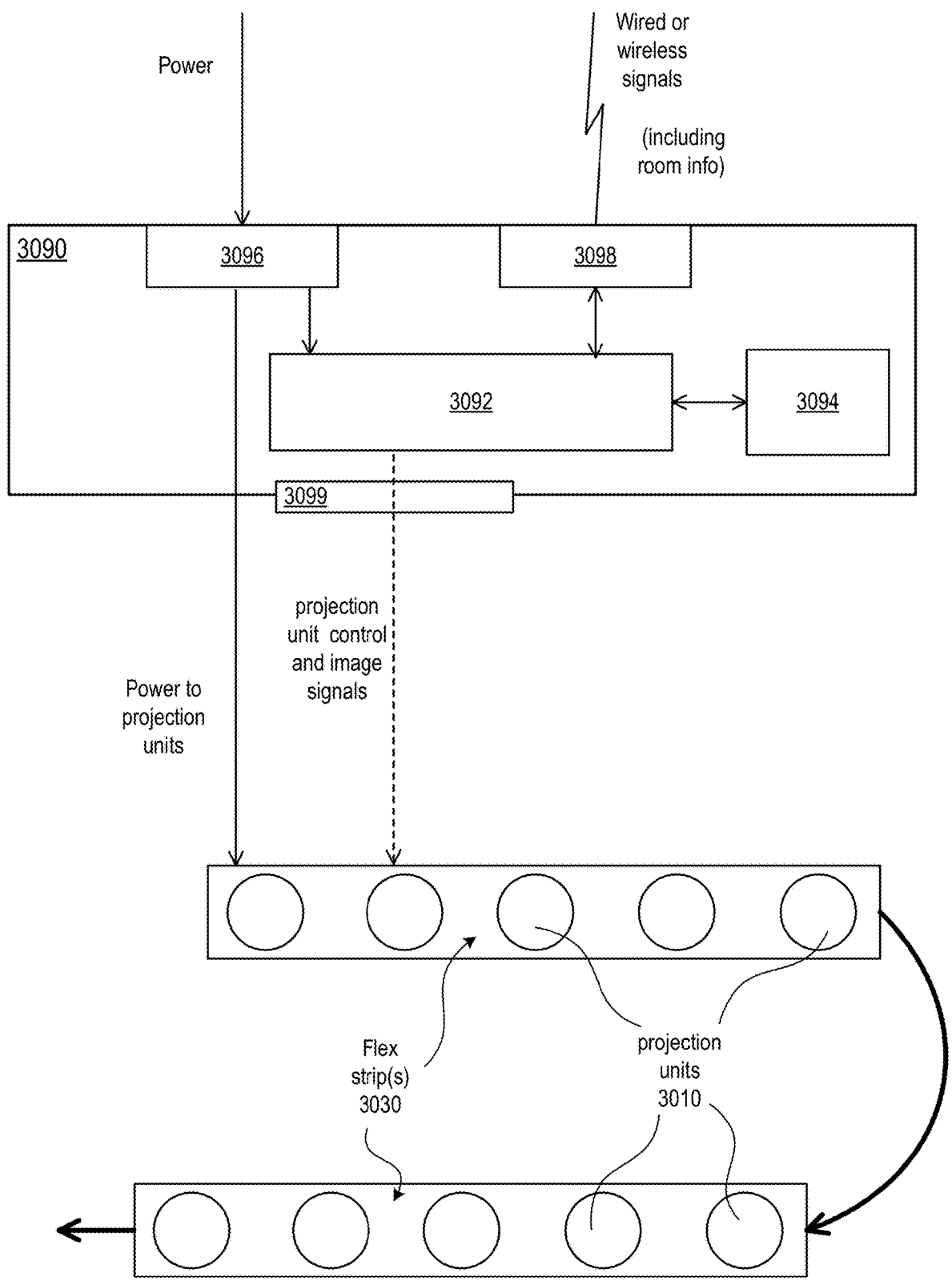
FIG. 10 is a block diagram illustrating components and functionality of an example spatial light system that receives room information from an external device, according to some embodiments.

FIG. 10 is a block diagram illustrating components and functionality of an example spatial light system that receives room information from an external device, according to some embodiments. In some embodiments, a spatial light system as described herein may include a controller 3090 that may implement and control functionality of the spatial light system. In some embodiments, the controller 3090 may include, but is not limited to, one or more processors 3092, memory 3094, power supply 3096 technology, communications interface 3098 technology (e.g., a Bluetooth technology interface, USB interface, etc.), and serial interface 3099 technology (e.g., SDI (serial digital interface) technology).

The controller 3090 may receive room information from an external device via wired or wireless signals to communications interface 3098, for example from a remote control, smartphone, tablet or pad device, laptop or other computer system, an AR/VR system, or other smart device such as a television. The room information may be stored to memory 3094. As shown in this example, the controller 3090 functions to drive or control the projection units 3010 on flex strip(s) 3030 to emit light into a room according to image content and the room information obtained from an external device. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 3010 are to be focused, objects or surfaces to be illuminated or not illuminated, and so on.

Image content to be projected by the spatial light system may be obtained from an external device, for example via a wireless connection through interface 3098, or alternatively may be generated by controller 3090 based on image information stored locally in memory 3094.

In some embodiments, controller 3090 may generate or render video or images based on the room information and image content that may be projected by projection units 3010 coupled to the controller 3090 via flex strips 3030 connected to the controller 3090 via serial interface 3099. In other embodiments, the projection units 3010 may be implemented in other ways, for example, coupled to a composable light emitter module or using fiber optic filaments in a bulb-like projection device. In some embodiments, controller 3090 may also include memory 3094 that, for example, stores software that is executable by the controller 3090, data that may be used by the controller 3090 including but not limited to room information, and/or that includes buffer(s) for image or video content. In some embodiments, controller 3090 may also include one or more interfaces 3098 that may facilitate communication with an external device via a wired or wireless connection. In some embodiments, the external device may send image content (e.g., video) to be rendered and displayed by the spatial light system to the controller 3090 via interface 3098, and may also send signals to control operations of the spatial light system to the controller 3090 via interface 3098. The external device may be or may include any type of computing system or computing device, such as a desktop computer, notebook or laptop computer, pad or tablet device, smartphone, hand-held computing device, game controller, game system, AR/VR device such as a head-mounted device, smart device such as a smart television, and so on.

In some embodiments the individual projection units 3010 may be controlled by controller 3090 via a serial communications protocol through interface 3199. In some embodiments, the serial communications protocol may be SDI (serial digital interface). However, other communications protocols may be used. In some embodiments, SDI may provide a 30 MHz rate at 16-bit color depth, and may maintain a 60 Hz per second frame rate.

In various embodiments, controller 3090 may be a uniprocessor system including one processor 3092, or a multiprocessor system including several processors 3092 (e.g., two, four, eight, or another suitable number). Controller 3090 may include central processing units (CPUs) that implement any suitable instruction set architecture, and may execute instructions defined in that instruction set architecture. For example, in various embodiments controller 3090 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 3090 may employ any microarchitecture, including scalar, superscalar, pipelined, superpipelined, out of order, in order, speculative, non-speculative, etc., or combinations thereof. Controller 3090 may include circuitry to implement microcoding techniques. Controller 3090 may include one or more processing cores that each execute instructions. Controller 3090 may include one or more levels of caches, which may employ any size and any configuration (set associative, direct mapped, etc.). In some embodiments, controller 3090 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 3090 may include one or more other components for processing and rendering video and/or images, for example image signal processors (ISPs), coder/decoders (codecs), etc.

Memory 3094 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Figure 11:
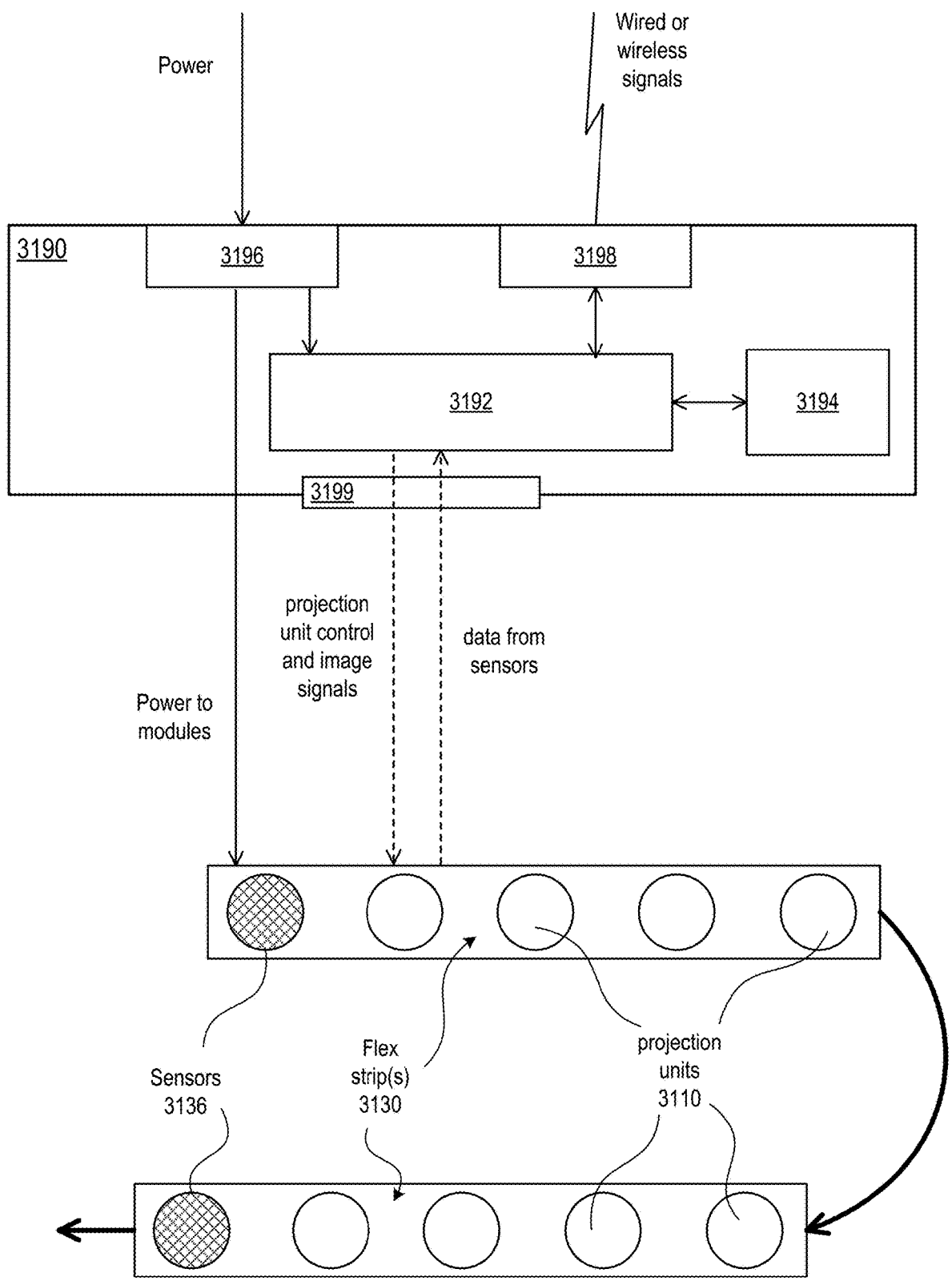
FIG. 11 is a block diagram illustrating components and functionality of an example spatial light system that includes sensors that collect data used to generate room information, according to some embodiments.

FIG. 11 is a block diagram illustrating components and functionality of an example spatial light system that includes sensors that collect data used to generate room information, according to some embodiments. In some embodiments, a spatial light system as described herein may include a controller 3190 that may implement and control functionality of the spatial light system. In some embodiments, the controller 3190 may include, but is not limited to, one or more processors 3192, memory 3194, power supply 3196 technology, communications interface 3198 technology (e.g., a Bluetooth technology interface, USB interface, etc.), and serial interface 3199 technology (e.g., SDI (serial digital interface) technology).

In this example, the spatial light system includes one or more sensor 3136 modules as well as projection units 3110. The sensors 3136 may collect data about the room that can be used to generate room information (e.g., surface depths, lighting, specular surfaces, motion, object detection and identification, etc.) The controller 3090 may obtain data from one or more of the sensors 3136 of the spatial light system and generate room information from the sensor data. The sensors 3136 may be, but are not necessarily coupled to the flex strips 3130. The room information may be stored to memory 3194. The controller 3090 may drive or control the projection units 3010 on the flex strips 3130 to emit light into a room according to image content and the room information generated from the sensor data. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 3110 are to be focused, objects or surfaces to be illuminated or not illuminated, and so on.

In some embodiments, a spatial light system may include at least one camera for tracking objects or persons within a room. In some embodiments, a camera may be implemented as a sensor module 3136 that plugs into a flex strip 3130. Alternatively, in some embodiments, at least one of the projection units 3110 may include an embedded camera. In some embodiments, the embedded camera may be confocal with the light projection mechanism of the projection unit 3110; that is, the camera uses the same optical path as the light projection mechanism of the projection unit 3110 to capture images or video of a portion of a room. Tracking an object or person may, for example, allow the spatial light system to project light with respect to a moving object or person to augment that object or person, for example to project light in front of a moving toy car to provide the appearance of headlights of the car, or to "spotlight" a moving person in a room.

Image content to be projected by the spatial light system may be obtained from an external device, for example via a wireless connection through interface 3198, or alternatively may be generated by controller 3190 based on image information stored locally in memory 3194.

In some embodiments, controller 3190 may generate or render video or images based on the room information and image content that may be projected by projection units 3110 coupled to the controller 3190 via flex strips 3130 connected to the controller 3190 via serial interface 3199. In other embodiments, the projection units 3010 may be implemented in other ways, for example, coupled to a composable light emitter module or using fiber optic filaments in a bulb-like projection device. In some embodiments, controller 3190 may also include memory 3194 that, for example, stores software that is executable by the controller 310, data that may be used by the controller 3190 including but not limited to room information, and/or that includes buffer(s) for sensor data and image or video content. In some embodiments, controller 3190 may also include one or more interfaces 3198 that may facilitate communication with an external device via a wired or wireless connection. In some embodiments, the external device may send image content (e.g., video) to be rendered and displayed by the spatial light system to the controller 3190 via interface 3198, and may also send signals to control operations of the spatial light system to the controller 3190 via interface 3198. The external device may be or may include any type of computing system or computing device, such as a desktop computer, notebook or laptop computer, pad or tablet device, smartphone, hand-held computing device, game controller, game system, AR/VR device such as a head-mounted device, smart device such as a smart television, and so on.

In some embodiments the individual projection units 3110 may be controlled by controller 3190 via a serial communications protocol through interface 3199. In addition, data from sensors 3136 may be obtained via the serial communications protocol through interface 3199 and flex strip(s) 3130. In some embodiments, the serial communications protocol may be SDI (serial digital interface). However, other communications protocols may be used. In some embodiments, SDI may provide a 30 MHz rate at 16 bit color depth, and may maintain a 60 Hz per second frame rate.

In various embodiments, controller 3190 may be a uniprocessor system including one processor 3192, or a multiprocessor system including several processors 3192 (e.g., two, four, eight, or another suitable number). Controller 3190 may include central processing units (CPUs) that implement any suitable instruction set architecture, and may execute instructions defined in that instruction set architecture. For example, in various embodiments controller 3190 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 3190 may employ any microarchitecture, including scalar, superscalar, pipelined, superpipelined, out of order, in order, speculative, non-speculative, etc., or combinations thereof. Controller 3190 may include circuitry to implement microcoding techniques. Controller 3190 may include one or more processing cores that each execute instructions. Controller 3190 may include one or more levels of caches, which may employ any size and any configuration (set associative, direct mapped, etc.). In some embodiments, controller 3190 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 3190 may include one or more other components for processing and rendering video and/or images, for example image signal processors (ISPs), coder/decoders (codecs), etc.

Memory 3194 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Figure 12:
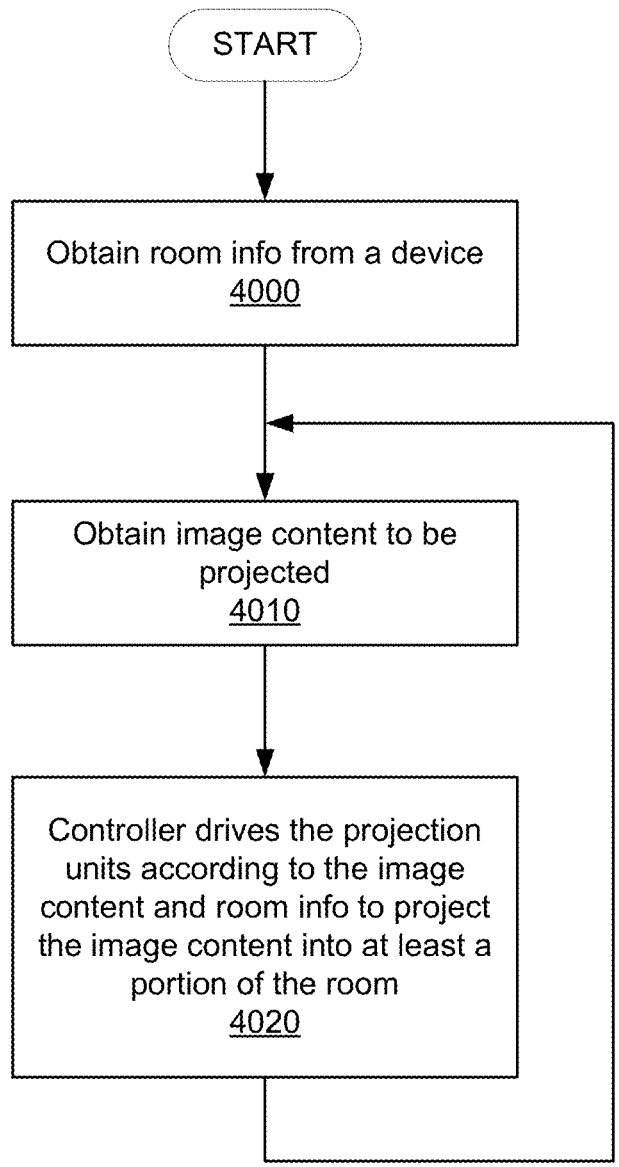
FIG. 12 is a high-level flowchart of a method of operation for an example spatial light system that receives room information from an external device, according to some embodiments.

FIG. 12 is a high-level flowchart of a method of operation for an example spatial light system that receives room information from an external device, according to some embodiments. As indicated at 4000, the spatial light system may obtain room information from a device, for example via a wireless connection. The device may, for example, be a smartphone, tablet or pad device, laptops or other computer system, AR/VR system, or other smart device such as a television. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents.

As indicated at 4010, the spatial light system may obtain image content to be projected into the room. The image content may be obtained from an external device, for example via a wireless connection, or alternatively may be generated based on image information stored locally in memory of the system.

As indicated at 4020, a spatial light system controller may drive the projection units according to the image content and room information to project the image content into at least a portion of the room. The system may, for example, project illuminating light, AR imagery, patterns, or other image content onto the floor, walls, and/or ceiling of a room. However, the system may also intelligently light or augment particular objects found within a room, and/or intelligently not illuminate certain surfaces or objects such as windows or television screens, or persons, within a room, based on the room information obtained from an external device.

In some embodiments, to drive the projection units, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

As indicated by the arrow returning from 4020 to 4010, the method may continue to obtain or generate image content and project the image content while the system is in use. While not specifically shown, additional or updated room information may be obtained from an external device while the system is in use; the additional or updated information may be used to adjust projection of the image content into the room.

Figure 13:
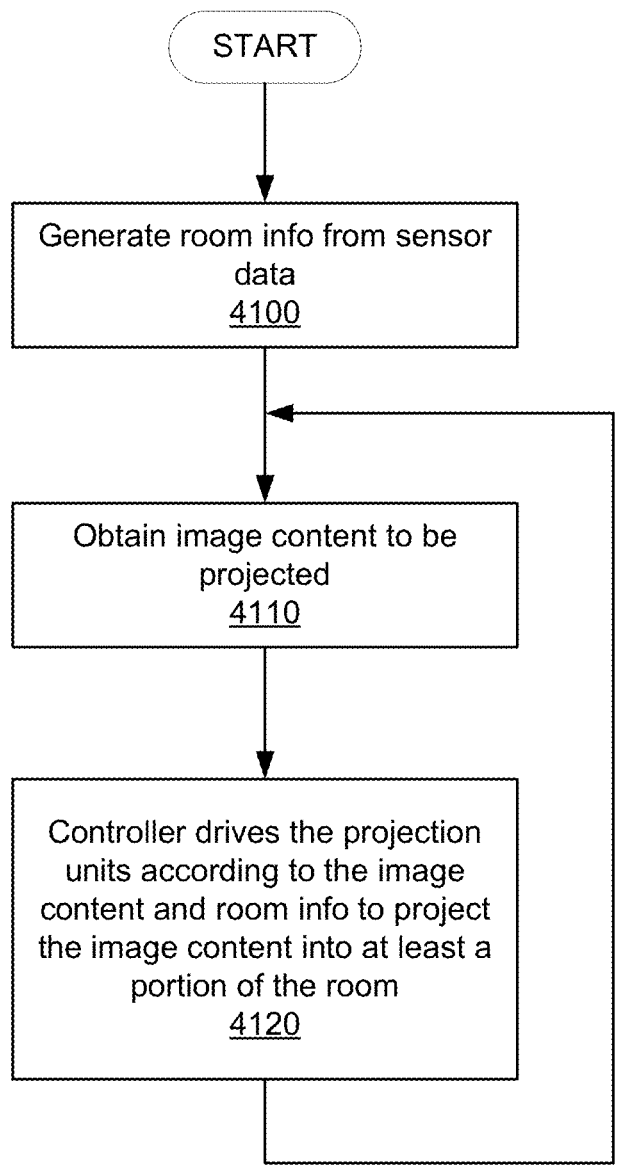
FIG. 13 is a high-level flowchart of a method of operation for an example spatial light system that includes sensors that collect data used to generate room information, according to some embodiments.

FIG. 13 is a high-level flowchart of a method of operation for an example spatial light system that includes sensors that collect data used to generate room information, according to some embodiments. As indicated at 4100, the spatial light system may generate room information from data collected by one or more sensors integrated in the spatial light system. For example, the sensors may be modules that connect to the flex strips to which the projection units are also connected. In other embodiments, the sensors may be coupled to other components, such as composable light emitter modules or the external enclosure of the spatial light system. The sensors may actively collect data about the room that can be used to generate the room information (e.g., surface depths, lighting, specular surfaces, motion, object detection and identification, etc.) and provide the collected data to a controller of the spatial light system. For example, one or more sensors may collect lighting information for existing artificial and natural light sources in a room, such as lamps, televisions, and windows.

As indicated at 4110, the spatial light system may obtain image content to be projected into the room. The image content may be obtained from an external device, for example via a wireless connection, or alternatively may be generated based on image information stored locally in memory of the system.

As indicated at 4120, a spatial light system controller may drive the projection units according to the image content and room information to project the image content into at least a portion of the room. The system may, for example, project illuminating light, AR imagery, patterns, or other image content onto the floor, walls, and/or ceiling of a room. However, the system may also intelligently light or augment particular objects found within a room, and/or intelligently not illuminate certain surfaces or objects such as windows or television screens, or persons, within a room, based on the room information obtained from an external device.

In some embodiments, to drive the projection units, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

As indicated by the arrow returning from 4120 to 4110, the method may continue to obtain or generate image content and project the image content while the system is in use. While not specifically shown, additional data may be obtained from the sensors while the system is in use; the additional data may be used to adjust the room information and thus the projection of the image content into the room.

Figure 14:
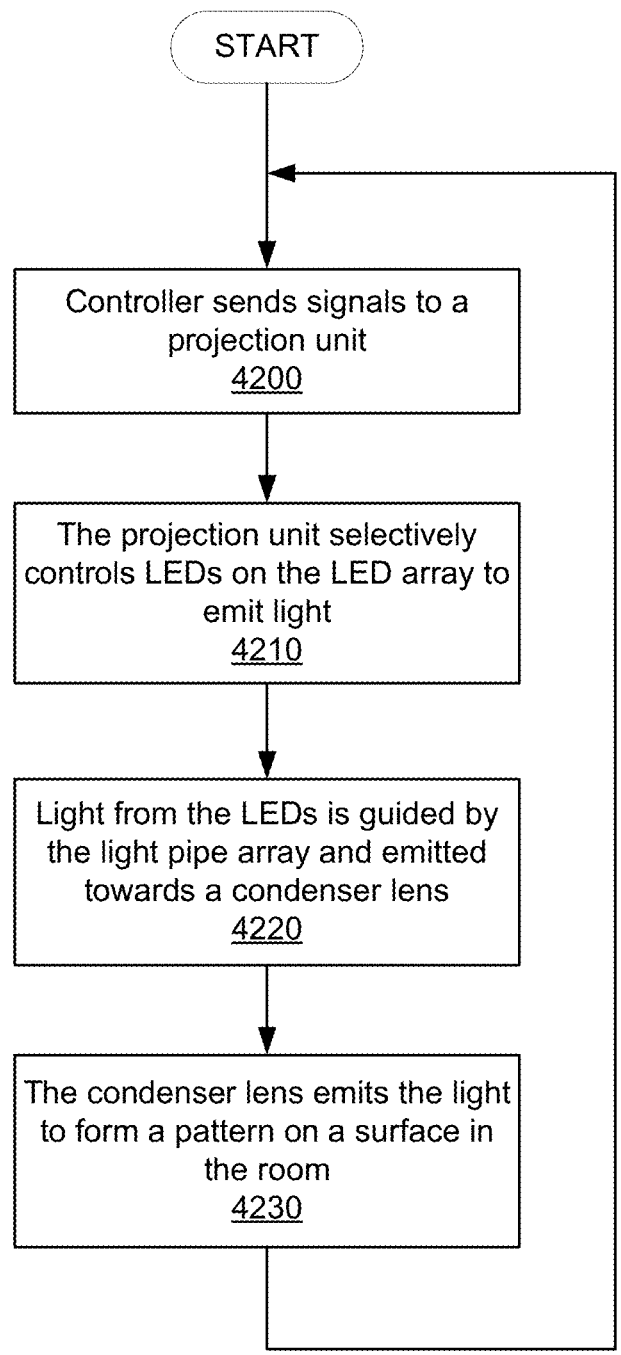
FIG. 14 is a high-level flowchart of a method of operation for an example projection unit, according to some embodiments.

FIG. 14 is a high-level flowchart of a method of operation for an example projection unit, according to some embodiments. As indicated at 4200, the controller sends signals to a projection unit. As indicated at 4210, the projection unit selectively controls LEDs on the LED array to emit light. As indicated at 4220, light from the LEDs is guided by the light pipe array and emitted towards a condenser lens. As indicated at 4230, the condenser lens emits the light to form a pattern on one or more surfaces in the room. Note that the controller may simultaneously drive multiple projection units to project image content onto surface(s) in the room. The light from two or more projection units may overlap to form "pixels" on the surface; the pixels represent the image content that is being projected.

Figure 15:
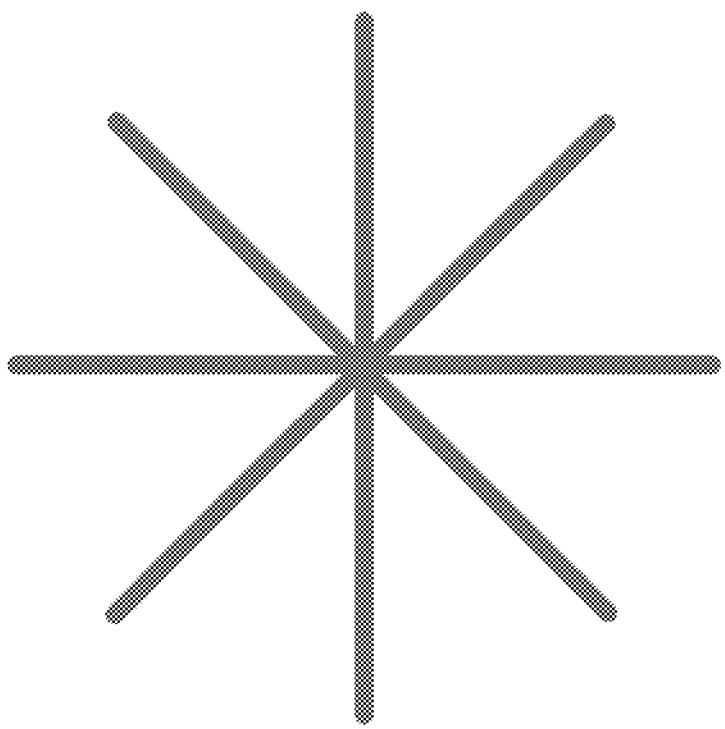
FIG. 15 illustrates different configurations for flexible strips, according to some embodiments.
Figure 15:

FIG. 15 illustrates different configurations for flexible strips, according to some embodiments. FIG. 15 (A) shows a flexible strip configured as a single linear strip that can be applied to the surface of a shape. FIG. 15 (B) shows a flexible strip configured in an "octopus" configuration that includes N strips extending from a central hum. FIG. 15 (C) shows a flexible strip configured as a spiral. Note that these configurations are given as examples, and are not intended to be limiting, and other configurations are possible.

While embodiments are generally described in which the flexible strips are attached to a shaped object such as a sphere or cylinder to form a spatial light system, the flexible strips may be attached to other objects, or to walls, ceilings, floors, or other surfaces, within a room to provide custom lighting configurations with similar capabilities as the spatial light system configurations described herein.

Color Display Content

In some embodiments, color display content can be provided by the projector(s) in the AR light systems described herein by using an array of discrete red, green, and blue conventional LED sub-pixels. In some embodiments, a tunable white output may be achieved with selected color temperature conventional white LEDs, selectively driven within the LED arrays. In some embodiments, arrays of monolithic Indium Gallium Nitride (InGaN) tunable color LEDs can be used, for example as described in: Chen, J. C., et al. "Growth of monolithic full-color light-emitting diode and its applications." *Gallium Nitride Materials and Devices XIV*. Vol. 10918. International Society for Optics and Photonics, 2019. In some embodiments, LEDs containing three different sets of quantum wells separated with intermediate carrier blocking layers may be used. In some embodiments, pulsed drive current containing different current amplitudes and widths, each creating a separate color, may be used. Alternatively a white output with tunable color temperature can be achieved.

In some embodiments, white light may be created using a UV source (often around 400 nm) which is then excited a by phosphor that is deposited on the device window. The UV illumination is unconverted by the excited phosphor to create a broad spectrum of illumination that results in white light output. In some embodiments, the white light may be "tuned" by changing the phosphor in real-time (e.g., a tilting disc, color wheel, or other combination of beam-steering through appropriate filtering) to create a slightly shifted white balance. In some embodiments, RGB light sources can be added in and "mixed" to enhance or further shift the white spectrum being generated.

Spatial Light System Use Cases and Applications

The following describes several example use cases and applications for embodiments of a spatial light system as described herein. A spatial light system may be a device that lies somewhere between a projector and a light bulb. A spatial light system may be as bright as a light bulb, and may generate as high-quality light as a light bulb, but is higher resolution than a light bulb. However, a spatial light system may not be as high resolution as a conventional projector. Following from this, the spatial light system provides many interesting use cases and applications.

In some embodiments, a spatial light system may be configured as a sphere that has a number of emitting pixels; each dot on the sphere corresponds to an LED that is projected onto the wall; the dots may be blended to generate imagery, for example sky and cloud images that an occupant of a room sees in the background, projected onto surfaces of the room by the spatial light system. The projected pixels on a wall may look fairly big and the imagery may be fairly low resolution when compared to pixels and imagery projected by a conventional projector. Depending on the embodiment, the spatial light system may take on a variety of shapes, such as cylindrical tubes, dome lights, recessed lights, or ring chandeliers, as just a few examples. In some embodiments, a spatial light system may be implemented in the form of a light bulb, which may be designed to fit into a conventional light bulb socket.

Embodiments of a spatial light system may also rely on understanding the room that the system is in. Using room information obtained from an external source and/or from sensors of the system, light can be selectively projected or not projected onto particular surfaces or objects in the room. For example, the system may use its understanding of the room to avoid direct lighting on certain areas of the room, such as television screens, windows, or the faces of persons in the room. The room information may also be used to modulate brightness to avoid "hotspots" or similar undesirable lighting.

Embodiments of a spatial light system may be used to illuminate surfaces, floors, ceilings, or walls. Embodiments of a spatial light system may be used to create a spotlight that moves within a room without moving parts by turning on and off pixels. For example, a spatial light system may be configured to keep a spotlight in front of a person as the person moves through the room. As another example, a spatial light system may be configured to maintain lighting on an object (e.g. a table top) even if the table is moved. Embodiments of a spatial light system may also be used to create architectural lighting, to highlight photographs or paintings, or to create accent lighting with different color temperatures, all without changing any hardware in the room.

Embodiments of a spatial light system may be used to create effects such rain, tree shadows, etc., that bring outside elements into the room, or to create caustics and abstract effects within a room or portion of a room. For example, the spatial light system may be configured to slowly change the lighting in the room based on the time of day and/or the weather. As another example, the spatial light system may be configured to project Christmas-themed mood lighting for the living room during the Holidays.

Embodiments of a spatial light system can also be used to interact with other devices in the room. Embodiments of a spatial light system may be used to expand or extend the content of devices, for example by expanding the content of a television into the entire room.

In some embodiments, a spatial light system may emit spatial light in combination with other devices, for example to provide the expansion of television content to other room surfaces. For example, embodiments of a spatial light system may generate content that augment the content being played on a television. For example, a spatial light system may generate mood lighting for music being played on an audio player. The mood lighting may be generated based on the cover art of an album, and may pulsate (e.g. change color saturation or brightness) based on the rhythm of the playing music. As another example, a spatial light system may project special lighting content that is designed to be played along with a primary content (e.g. an audio book or podcast). For example, the reading of the audio book "The Hunchback of Notre-Dame" may be accompanied by a "mood lighting track" that depicts a wall shadow of the character Quasimodo. In some embodiments, the spatial light system may be configured to spotlight a device such as a TV or an audio player when the device is turned on or playing content. In some embodiments, the spatial light system may be implemented as part of the TV or audio player.

In some embodiments, the system may emit light to provide a low-resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

Embodiments of a spatial light system may create a virtual portal window. For example, for a person working from home, a virtual portal window may be generated to make a room at home feel more like an open office when working, or to provide a virtual window in an enclosed room.

In some embodiments, the spatial light system may be configured to project a moving user interface on a surface nearest to a moving person in the room. The projected user interface may be projected so that it follows the person from room to room. Such a user interface may be used to display content such as a wall clock, alarms, or a low-resolution view of visitors at the door captured by a door camera.

Embodiments of a spatial light system may be controlled from an external device such as a remote control, smartphone, pad or tablet using touch, keystrokes, and/or voice commands. In some embodiments, a central controller device may be used to control all spatial light systems inside a house. The controller device may be used to cause the lighting systems to perform certain tasks, such as turning on or off individual lighting systems, performing a sensor scan of a room, reconfiguring room information saved by the lighting systems, etc. In some embodiments, the external device may include a voice interface that is able to recognize voice commands from a user. For example, using sensor technology and the ability to spotlight locations within a room, a voice command could be given to find an item in a room, such as a set of keys. In response to the command, the spatial lighting system may shine a spotlight on the location of the keys in the room.

Embodiments of a spatial light system may adjust the rendering of imagery within a room based on a detected point of view of a person within the room. Embodiments of a spatial light system may also affect the projected light based on the presence and movement of a person or persons within a room, for example to track and spotlight a moving person, or to not emit light towards the face of a person detected within the room.

Embodiments of a spatial light system may be used with a camera to improve photography by using emitted light to create bounced light, or different studio effects.

Embodiments of a spatial light system may be used to create cool or warm accent lighting within a room.

Most of these examples rely on embodiments of a spatial light system that includes projection units with multiple LEDs on a surface of a sphere. The projection unit technology may also be used to create a light bulb that projects imagery onto a localized object or surface. A light or lamp in this configuration may have the same or similar capabilities of understanding the room environment, and may provide a low resolution, bright projector based on LEDs that can do similar things as a sphere-shaped spatial light system.

In some embodiments, multiple spatial light systems may be used together, and configured to interact and coordinate with one another either by direct communication via a wired or wireless connection or through an external device. Using room information obtained by spatial light system sensors or from an external device, each spatial light system may know where the other spatial light system(s) are located, and may work together to complement each other, and to generate imagery from the combined light of the spatial light systems. In some embodiments, two or more spatial light systems may work in synchronization with each other, aware of their respective locations, orientations, and light output through wired or wireless communications channel(s), (e.g., ultra-wideband (UWB), cameras, sensors, pulsed visible or non-visible light signals, etc.) or through external device calibration, for example to create more room filling experiences, to avoid issues such as shadows, and/or to increase overall light output. In some embodiments, multiple spatial light systems may be configured to illuminate a long surface such as a walkway or a wall, so that each lighting system can light up a different section of the long surface. In some embodiments, multiple spatial light systems may be configured to project onto the same surface, so that different layers of content (e.g. different colors) are projected to the surface at the same time.

In some embodiments, one or more spatial light systems may be installed as interior lighting inside a vehicle such as a car or a plane. For example, a spatial light system may be used as the dome light in the car. In some embodiments, multiple spatial light systems may be used in the car's interior, for example, above each of the passenger seats. These light systems may be used to implement a variety of different lighting applications as described previously, such as spotlighting, mood lighting, locating objects, etc.

FIGS. 16 through 23 show different use cases and applications for a spatial light system, according to some embodiments.

Figure 16:
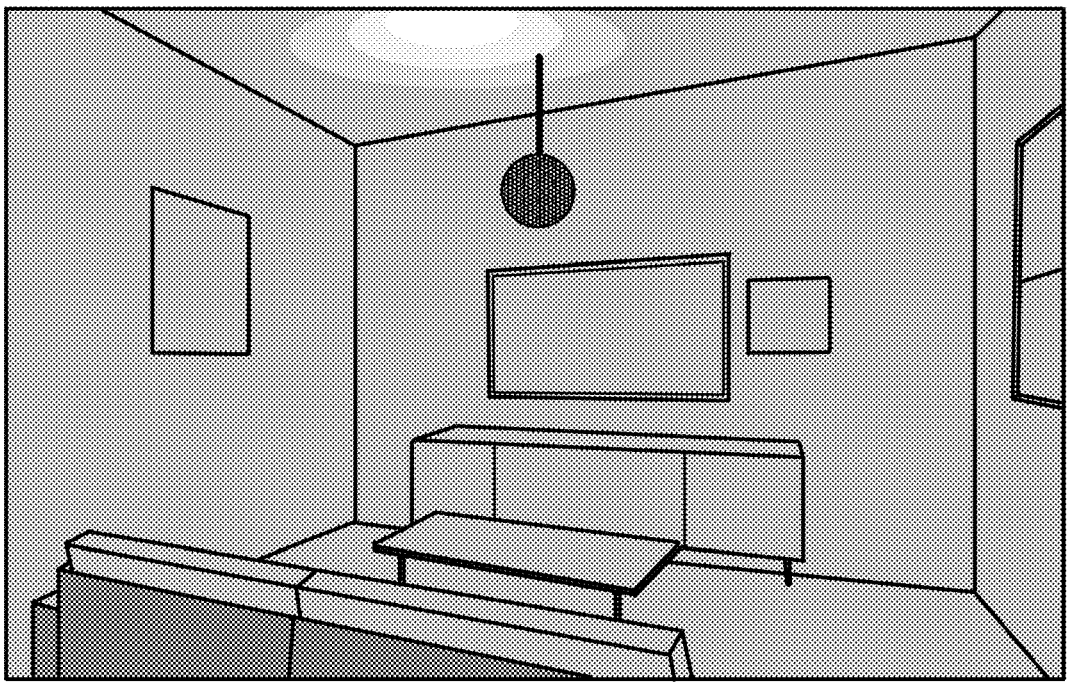
FIGS. 16 through 23 show different use cases and applications for a spatial light system, according to some embodiments.

FIG. 16 shows a use case where a spatial light system is used to illuminate a room. The spatial light system may project dots onto the wall. Each "dot" on the wall is a pixel projected by one or more LEDs of the spatial light system. The light may be white light, or may be mixed/color light.

Figure 17:
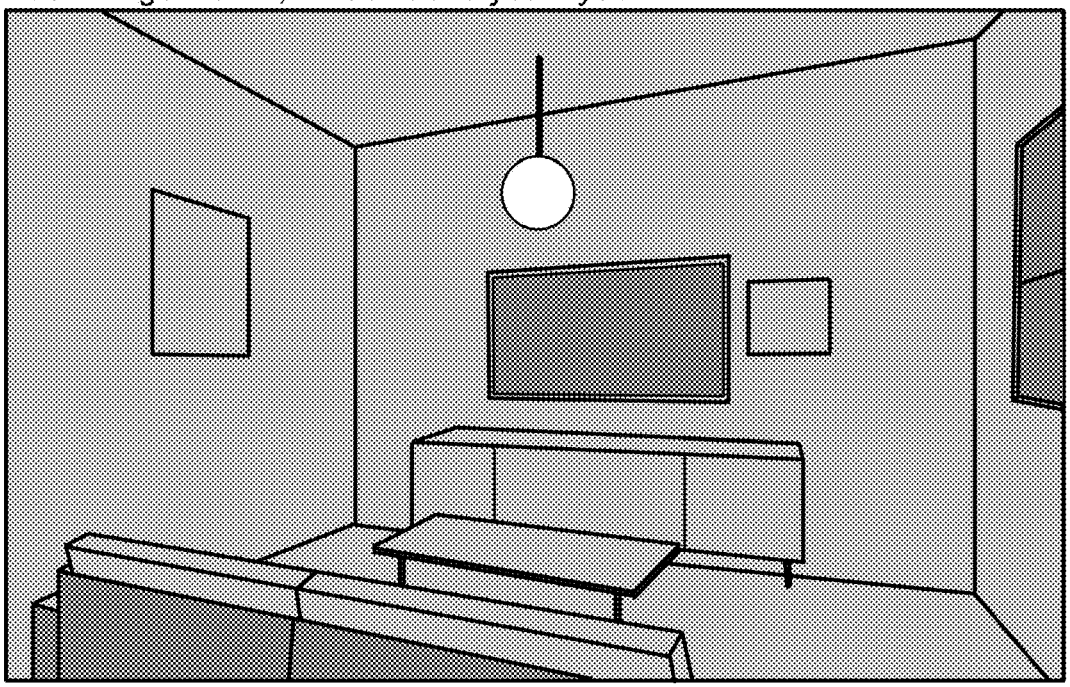

FIG. 17 shows a use case where a spatial light system is used to selectively illuminate a room so that reflective surfaces such as televisions and windows are not illuminated. The system may also not directly illuminate the faces of person(s) in the room.

Figure 18:
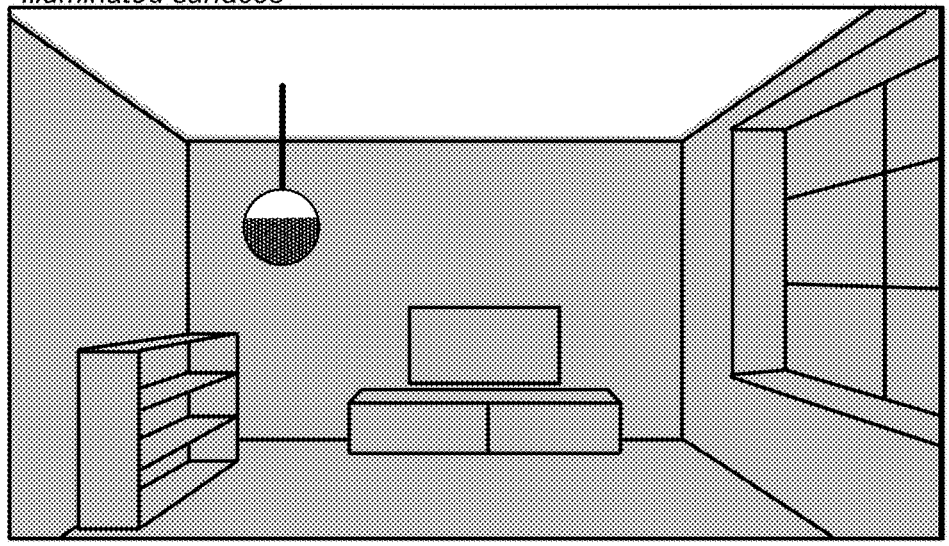
Figure 19:
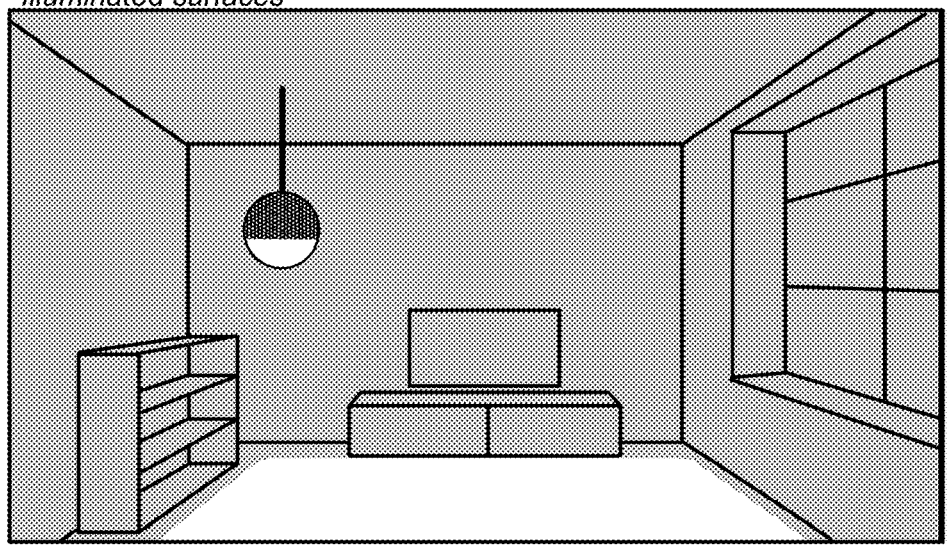
Figure 20:
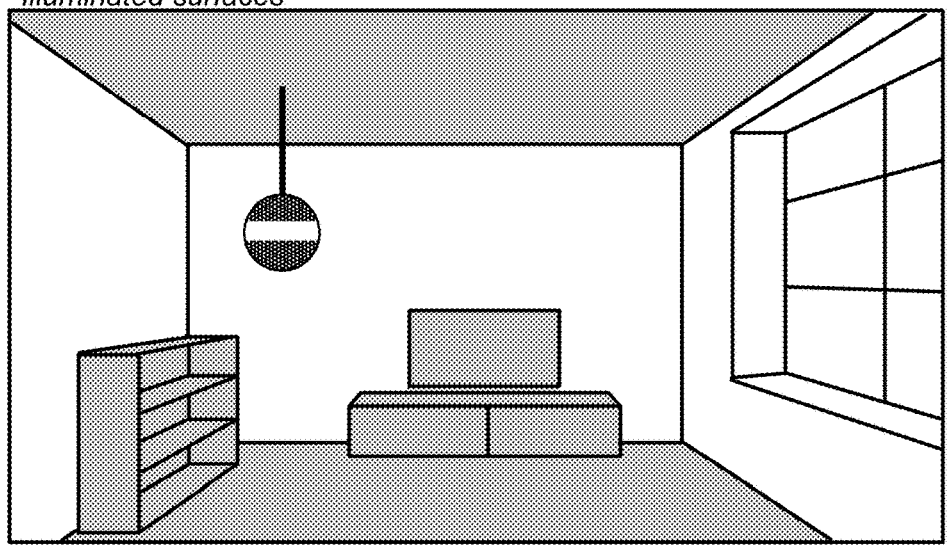

FIGS. 18, 19 and 20 show a use case where a spatial light system is used to selectively illuminate surfaces in a room. In FIG. 18, the ceiling is illuminated. In FIG. 19, the floor is illuminated. In FIG. 20, the walls are illuminated.

Figure 21:
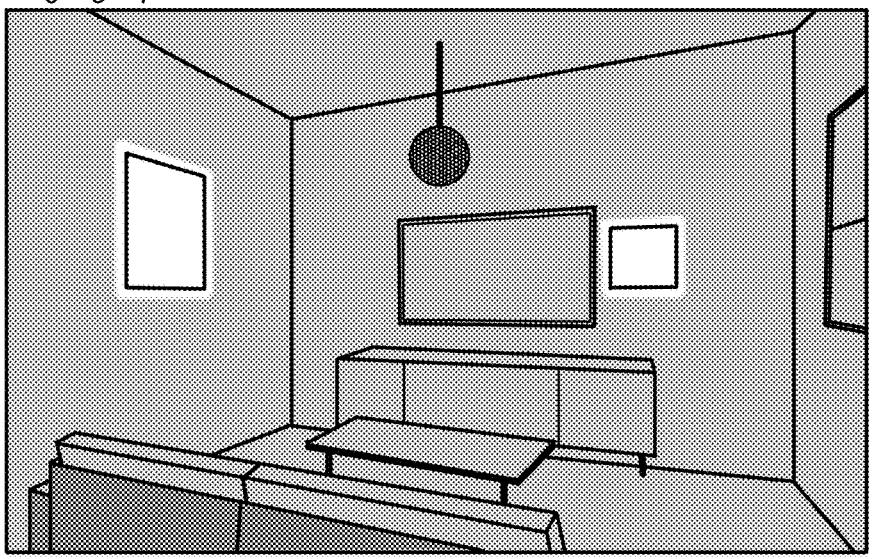

FIG. 21 shows a use case where a spatial light system is used to selectively illuminate particular objects in a room, in this example one or more photographs or other artwork on the walls.

Figure 22:
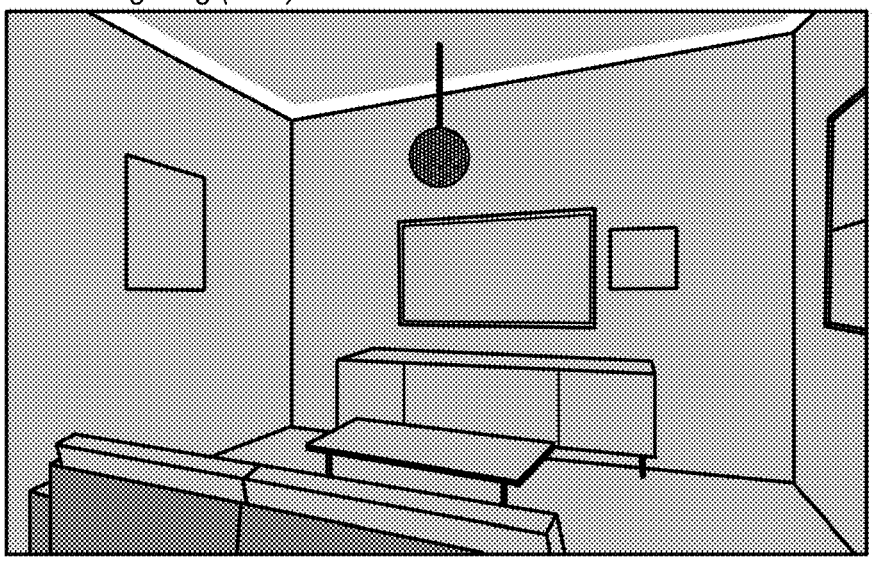

FIG. 22 shows a use case where a spatial light system is used to provide accent lighting within a room.

Figure 23:
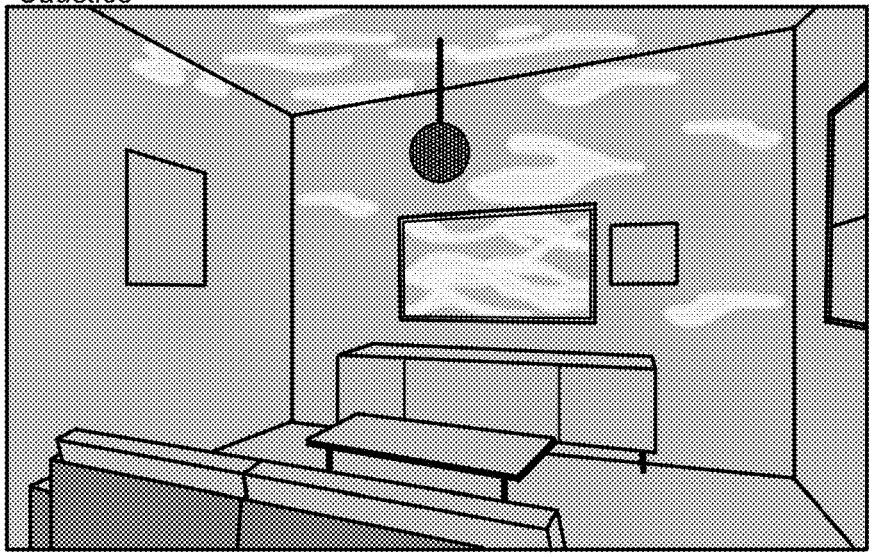

FIG. 23 shows a use case where a spatial light system is used to project caustics or other graphical content on surfaces in a room. The projected imagery may be still or may move. Other similar effects may include, but are not limited to the shadows of trees or soft rain.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see-through displays. A see-through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 24:
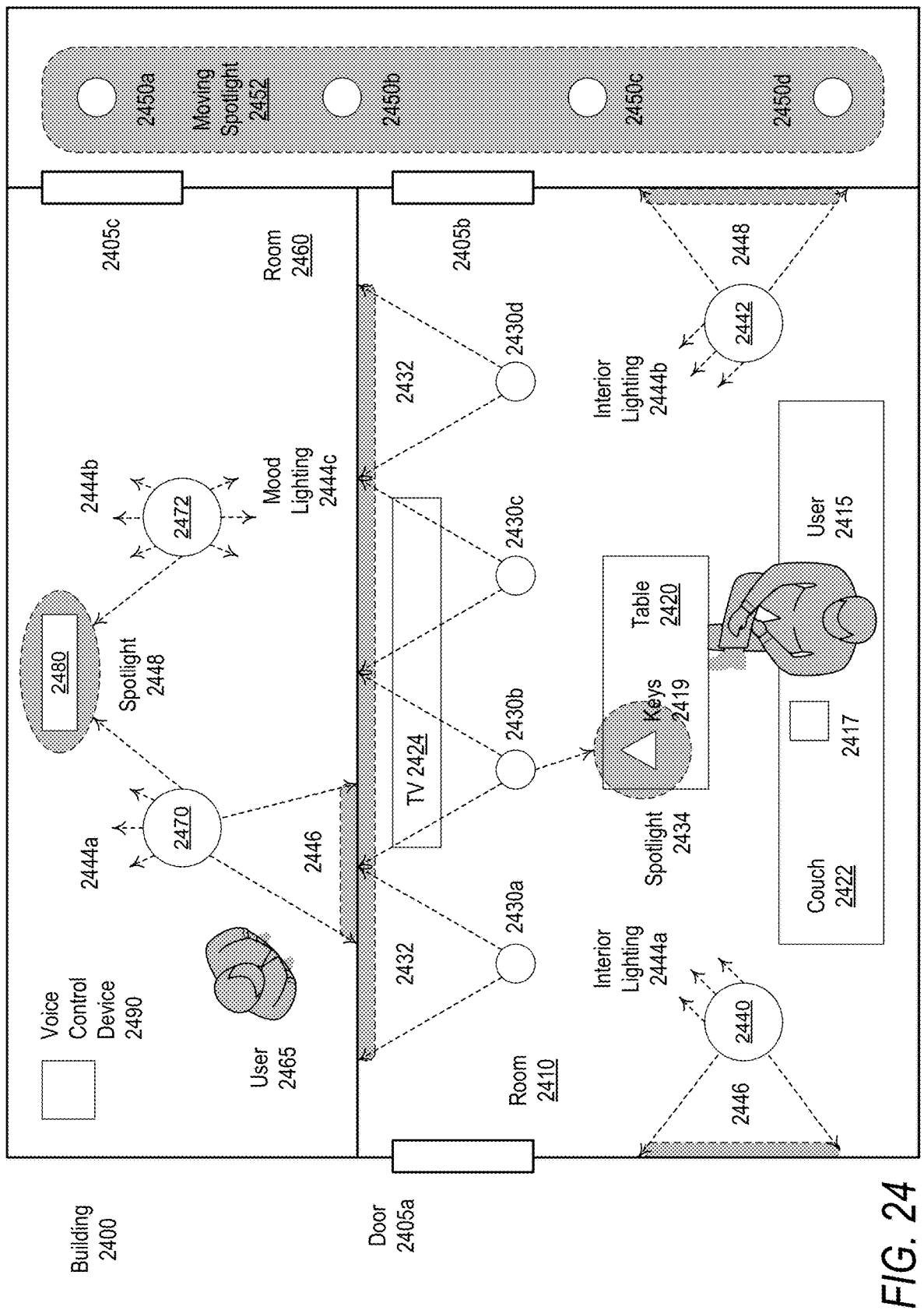
FIG. 24 shows a building with multiple rooms or enclosures equipped with different spatial light systems that implement different interior lighting applications, according to some embodiments.

FIG. 24 shows a building with multiple rooms or enclosures equipped with different spatial light systems that implement different interior lighting applications, according to some embodiments.

As shown in the figure, building 2400 (e.g. a house or apartment unit) includes two rooms 2410 and 2460, accessible via doors 2405*a-c*. Various embodiments of spatial light systems, as described previously, are installed in the building. Instances of these spatial light systems are shown as circles. These light systems may be implemented in a variety of forms, such as dome lights, recessed lights, spherical lights, movable light sources such as floor lamps, desk lamps, or flashlights etc. In some embodiments, the lights may be mounted as fixtures on the ceiling, the floor, or sidewalls. In some embodiments, the lights may be integrated into various devices, such as smart TVs, audio players, or other types of computer systems.

As discussed, in some embodiments, these light systems may store room information and project light to known surfaces in their respective rooms based on the room information. Such room information may be uploaded to the light systems from a central controller device (e.g. a computer or a smartphone), or shared among the light systems using a peer-to-peer protocol. In some embodiments, the light systems may include sensors that collect the room information (e.g. LIDAR sensors). In some embodiments, some of the room information may be collected continuously so that the state of the room is actively tracked by the light systems.

As shown, a user 2415 is sitting on a couch 2422 in room 2410. The user 2415 has a personal device 2417 (e.g. a smartphone), which can be used as a controller device for the various light systems in the building. Such as controller device 2417 may be used to, for example, turn on or off certain light systems, change the operating parameters of individual light systems, cause the light systems to perform a spatial scan of the room, among other tasks. In some embodiments, the controller devices may allow each user 2415 and 2465 may store preferences about the light systems in the building, so that operation of the light systems can be customized according to such preferences.

In some embodiments, the light systems in the building may be configured to track the movement of users 2415 and 2465 through the building. The light systems may use such information to optimize the lighting experience for the user. For example, the lighting systems may be configured to avoid shining light directly in the face of a user, select projection surfaces nearest to the user, dynamically provide a spotlight in front of the user as he or she moves around the building, or automatically turn lights on or off as the user enters or exits a room. For example, as shown, a series of light systems 2450a-d are installed in a hallway of the building 2400. These lights may be configured to light up portions of the hallway as a user is walking through the hallway, and turn off as the user walks past, so as to create a moving spotlight 2452 on or in front of the user in the hallway. In some embodiments, the light systems may change the lighting based on a perceived state of the user (e.g. if the user appears to be sleeping).

In some embodiments, the light systems may be configured to project light on different surfaces in the room. For example, the lights 2430a-d are used to project onto a wall behind a TV system 2424. These lights 2430 may be used to play augmented reality content or extended content 2432 based on the content being played on the TV 2424. In some embodiments, the augmented or extended content may be generated based on the TV content itself (e.g. to match the lighting of a current TV scene). In some embodiments, the augmented or extended content may be a separate content track that is designed to accompany the TV content. In some embodiments, the lights 2430 may mask the location of the TV to avoid creating glare from the TV.

As shown, lights 2440 and 2442 are used to create interior lighting 2444a and 2444b in the room. In some embodiments, such interior lighting may be used as mood lighting to create dynamic lighting effects. In some embodiments, the interior lighting may be configured to mimic outside lighting (e.g. to reflect outside weather, time of day, natural shadows, etc.) As shown, the lights 2440 and 2442 may also be configured to project light differently to particular areas on a wall. For example, projection area 2446 may be used to create a virtual window that provides a low-resolution view of an outside scene. As another example, projection area 2448 may be used to accent a painting hanging on the wall. In some embodiments, these configured projection areas may be remembered by the light systems, so that they will reproduce the same projection areas even if they are moved. In some embodiments, a light system may be instructed to rescan the room after it is moved to reorient itself in the room model (e.g. as indicated by the room information), and then adjust its projection parameters to achieve the same lighting effects as before.

As shown, in some embodiments, the light systems (e.g. light system 2430b) may be used to create an on-demand spotlight 2434 on a particular object, for example, a set of keys 2419 on the table 2420. Such a spotlight may be created using a control device such as smartphone 2417, or a voice control device that can understand human verbal commands. For example, embodiments of the lighting systems may be used to create an on-demand spotlight in front of a user, or to find an object in the room. In some embodiments, a user may issue a command to look for an object in the building (e.g. the keys 2419). The light systems may be configured to look for and recognize the desired object within their respective fields of view using its sensors, and spotlight the object if it is found. In some embodiments, the light systems may cycle through a number of locations in the room with spotlights to allow the user to look for the object.

In room 2460, two light systems 2470 and 2472 are installed. The room 2460 also contains an audio sound system 2480, which may be a digital music player. In some embodiments, the light systems 2470 and 2472 may be configured to work in tandem with the sound system 2480, so as to generate mood lighting 2744a-c that is synchronized with music played by the sound system. In some embodiments, the mood lighting 2744 may generate a caustic lighting effect that changes with the beat or rhythm of the music. The projected light may be generated based on the cover art associated with the music (e.g. based on distortions of the cover art). In some embodiments, the projected light may produce dynamic lighting effects in the room, such as the spinning lights appearance of a disco ball. In some embodiments, the projected light may be configured to pulsate (e.g. adjust the color saturation or brightness) along with the rhythm of the music. In some embodiments, the mood lighting 2744 may be stored as a mood lighting track for accompanying the audio content. For example, a lighting track may be created for an audio book or podcast, which may be played by the light systems as the audio book or podcast is being played. In some embodiments, the light systems (e.g. light systems 2470 and 2472) may shine a spotlight 2748 on the sound system 2480 when the sound system is playing music.

In some embodiments, a light system (e.g. light system 2470) may be configured to generate a visual user interface 2746 near the user (e.g. user 2465) on a room surface close to the user. The user interface 2746 may be used to provide information to the user using low-resolution graphics. For example, the user interface may be used to provide a wall clock that can follow the user around the building. The user interface may also be used to report alerts (e.g. new emails, set alarms) to the user. As another example, the user interface may provide a low-resolution view of scenes captured by video cameras. In this manner, every projectable surface in the building may be used as a graphical user interface. In some embodiments, the user may interact with the projected user interface 2746 by touching user interface elements in the user interface. In some embodiments, the user may instead interact with the light systems through a voice control device 2490, which may be configured to interpret voice commands and send the commands to the light systems.

The following clauses describe various examples embodiments consistent with the description provided herein:

Clause 1. A projector system, comprising:
a projection lens;
a plurality of composable light emitter modules controlled by a controller; and
wherein:
individual ones of the composable light emitter modules include a plurality of light pipes coupled to a substrate;
the light pipes are configured to guide light emitted by a plurality of light emitting diodes (LEDs) toward the projection lens;
the LEDs are individually addressable by the controller; and
the composable light emitter modules are positioned in a spatial arrangement to approximate a curved emission surface facing the projection lens.

Clause 2. The projector system of clause 1, wherein:
the light pipes are configured to produce respective light beams through projection lens; and
the light beams form pixels of an image projected by the projector system.

Clause 3. The projector system of clause 1, wherein the light pipes are configured to mix different colors of light emitted by the LEDs.

Clause 4. The projector system of clause 1, wherein:
the substrate is a circuit board; and
the light pipes are extrusions printed on the circuit board using a specular 3D printing technique.

Clause 5. The projector system of clause 1, wherein the projection lens is a spherical ball lens.

Clause 6. The projector system of clause 1, wherein individual ones of the composable light emitter modules are hexagonal in shape.

Clause 7. The projector system of clause 6, wherein:
the spatial arrangement includes seven composable light emitter modules, including a center module and six modules positioned on respective sides of the center module.

Clause 8. The projector system of clause 1, wherein the composable light emitter modules are connected in series to receive control signals from the controller.

Clause 9. The projector system of clause 1, wherein the controller is configured to:
determine how to project content onto a surface of a room, wherein the surface is determined based on room information about the room; and
control how the content is projected based on one or more parameters of the surface in the room information.

Clause 10. The projector system of clause 9, wherein the room information includes spatial information about the room and identifies locations of one or more projection surfaces in the room.

Clause 11. The projector system of clause 9, wherein:
the room information identifies locations of movable objects in the room; and
the projection system is configured to continuously track the locations of the movable objects over time.

Clause 12. The projector system of clause 9, wherein the room information is received from an external computing device equipped with one or more sensors.

Clause 13. The projector system of clause 9, wherein the external computing device is another projector system configured to establish a wireless connection with the projector system.

Clause 14. The projector system of clause 9, wherein the room information is captured by one or more sensors coupled to the projector system.

Clause 15. The projector system of clause 14, wherein at least one of the one or more sensors is a light detection and ranging (LIDAR) sensor.

Clause 16. The projector system of clause 14, wherein at least one of the one or more sensors is a camera.

Clause 17. The projector system of clause 14, wherein the projector system is configured to perform a spatial scan of the room using the one or more sensors in response to a user command.

Clause 18. A projector system, comprising:
a light bulb enclosure; and
a power interface configured to receive power from a light bulb socket; and inside the light bulb enclosure:
a controller configured to operate using power received from the power interface;
a light emitting diode (LED) array containing LEDs that are individually addressable by the controller; and
a projection lens; and
a light transport mechanism configured to transport light emitted by the LED array to the projection lens in a curved emission surface.

Clause 19. The projector system of clause 18, wherein:
the controller is configured to transmit video content to the LED array to cause the video content to be played by the LED array and projected through the projection lens.

Clause 20. The projector system of clause 18, wherein:
the controller includes a wireless interface; and
the controller is controlled according to wireless signals received via the wireless interface.

Clause 21. The projector system of clause 20, wherein the controller is configured to:
receive video content from an external device via the wireless interface; and
cause the LED array to play the video content.

Clause 22. The projector system of clause 18, further comprising:
a switchable diffuser mechanism controlled by the controller, configured to: under a first mode, diffuse light projected by the projection system; and
under a second mode, not diffuse the light projected by the projection system.

Clause 23. The projector system of clause 22, wherein the diffuser mechanism is implemented using polymer-dispersed liquid crystal (PDLC) technology or fast switching dual-frequency nematic liquid crystal technology.

Clause 24. The projector system of clause 18, wherein the light transport mechanism is implemented using a plurality of fiber optic filaments.

Clause 25. A system comprising:
a plurality of projector systems deployed in an enclosure, wherein each of the projector systems:
(a) includes a plurality of light emitting diodes (LEDs) addressable by a projection controller, (b) receives information about the enclosure including locations of one or more respective surfaces in the enclosure relative to the projection system, and (c) uses the information about the enclosure to project content onto the one or more respective surfaces; and the projector systems are configured to dynamically change the content based on received changes in the information about the enclosure.

Clause 26. The system of clause 25, wherein:
the enclosure includes a television; and
at least one of the projector systems is configured to project light content on a wall based on visual content playing on the television, wherein the light content changes based on changes in the visual content.

Clause 27. The system of clause 25, wherein:
the enclosure includes an audio system; and
at least one of the projector systems is configured to project light content on a wall based on audio content playing on the audio system, wherein the light content changes based on changes in the audio content.

Clause 28. The system of clause 25, wherein at least one of the projection systems is configured to dynamically change the content based on detected movements of a user in the enclosure.

Clause 29. The system of clause 28, wherein the projection system is configured to avoid projecting light into a face of the user as the user moves in the enclosure.

Clause 30. The system of clause 25, wherein at least one of the projection systems is configured to:
receive a user command to search for an object in the enclosure;
identify the object based on received spatial information about the enclosure; and
project a spotlight on the object.

Clause 31. The system of clause 30, wherein the user command is a voice command and received at a voice control device.

Clause 32. The system of clause 25, wherein the enclosure is an interior of a vehicle.

As will be appreciated by those skilled in the art, the use cases and applications described herein are merely examples. Numerous combinations and variations in these uses and applications are possible, as enabled by the spatial light systems and methods disclosed herein.

What is claimed is:

1. A projector system, comprising:
a projection lens;
a plurality of composable light emitter modules controlled by a controller;
wherein:
individual ones of the composable light emitter modules include a plurality of light pipes coupled to a substrate;
the light pipes are configured to guide light emitted by a plurality of light emitting diodes (LEDs) toward the projection lens;
the LEDs are individually addressable by the controller; and
the composable light emitter modules are positioned in a spatial arrangement to approximate a curved emission surface facing the projection lens; and
the controller, wherein the controller is configured to:
determine how to project content onto a surface of a room, wherein the surface is determined based on room information about the room; and
control how the content is projected based on one or more parameters of the surface in the room information.

2. The projector system of claim 1, wherein:
the light pipes are configured to produce respective light beams through projection lens; and
the light beams form pixels of an image projected by the projector system.

3. The projector system of claim 1, wherein the light pipes are configured to mix different colors of light emitted by the LEDs.

4. The projector system of claim 1, wherein:
the substrate is a circuit board; and
the light pipes are extrusions printed on the circuit board using a specular 3D printing technique.

5. The projector system of claim 1, wherein the projection lens is a spherical ball lens.

6. The projector system of claim 1, wherein individual ones of the composable light emitter modules are hexagonal in shape.

7. The projector system of claim 6, wherein:
the spatial arrangement includes seven composable light emitter modules, including a center module and six modules positioned on respective sides of the center module.

8. The projector system of claim 1, wherein the composable light emitter modules are connected in series to receive control signals from the controller.

9. The projector system of claim 1, wherein the room information includes spatial information about the room and identifies locations of one or more projection surfaces in the room.

10. The projector system of claim 1, wherein:
the room information identifies locations of movable objects in the room; and
the projection system is configured to continuously track the locations of the movable objects over time.

11. The projector system of claim 1, wherein the room information is received from an external computing device equipped with one or more sensors.

12. The projector system of claim 1, wherein the external computing device is another projector system configured to establish a wireless connection with the projector system.

13. The projector system of claim 1, wherein the room information is captured by one or more sensors coupled to the projector system.

14. The projector system of claim 13, wherein at least one of the one or more sensors is a light detection and ranging (LIDAR) sensor.

15. The projector system of claim 13, wherein at least one of the one or more sensors is a camera.

16. The projector system of claim 13, wherein the projector system is configured to perform a spatial scan of the room using the one or more sensors in response to a user command.

17. A projector system, comprising:
a light bulb enclosure;
a power interface configured to receive power from a light bulb socket; and
inside the light bulb enclosure:
a controller configured to operate using power received from the power interface;
a light emitting diode (LED) array containing LEDs that are individually addressable by the controller;
a projection lens; and a light transport mechanism configured to transport light emitted by the LED array to the projection lens in a curved emission surface;

wherein the controller is configured to:
  determine how to project content onto a surface of a room, wherein the surface is determined based on room information about the room; and
  control how the content is projected based on one or more parameters of the surface in the room information.

18. The projector system of claim 17, wherein:
the controller is configured to transmit video content to the LED array to cause the video content to be played by the LED array and projected through the projection lens.

19. A system, comprising:
a plurality of projector systems deployed in an enclosure, wherein each of the projector systems:
  (a) includes a plurality of light emitting diodes (LEDs) addressable by a projection controller,
  (b) receives information about the enclosure including locations of one or more respective surfaces in the enclosure relative to the projection system, and
  (c) uses the information about the enclosure to project content onto the one or more respective surfaces; and
the projector systems are configured to dynamically change the content based on received changes in the information about the enclosure.

\* \* \* \* \*